(12) United States Patent
Boss et al.

(10) Patent No.: US 10,902,863 B2
(45) Date of Patent: Jan. 26, 2021

(54) MITIGATING ANOMALOUS SOUNDS

(71) Applicant: International Business Machines Corporation, Armonk, NY (US)

(72) Inventors: Gregory J. Boss, Midland, MI (US); Michael Bender, Armonk, NY (US); Rhonda L. Childress, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

(21) Appl. No.: 16/043,212

(22) Filed: Jul. 24, 2018

(65) Prior Publication Data
US 2020/0035254 A1 Jan. 30, 2020

(51) Int. Cl.
G10L 21/0208 (2013.01)
G10L 15/16 (2006.01)
G06F 40/56 (2020.01)

(52) U.S. Cl.
CPC .......... *G10L 21/0208* (2013.01); *G06F 40/56* (2020.01); *G10L 15/16* (2013.01); *G10L 2021/02085* (2013.01); *G10L 2021/02087* (2013.01)

(58) Field of Classification Search
CPC ................. G10L 21/0208; G10L 15/16; G10L 2021/02085; G10L 2021/02087; G06F 40/56; H04M 3/567; H04M 3/568
See application file for complete search history.

(56) References Cited

U.S. PATENT DOCUMENTS

| | | |
|---|---|---|
| 7,061,871 B2 | 6/2006 | Sheldon et al. |
| 7,466,334 B1 | 12/2008 | Baba et al. |
| 8,767,922 B2 | 7/2014 | Kanevsky et al. |
| 9,307,089 B2 | 4/2016 | Nasir et al. |
| 9,467,569 B2 | 10/2016 | Femal |
| 10,142,484 B2 | 11/2018 | Spittle et al. |
| 10,182,207 B2 | 1/2019 | Lu et al. |
| 2004/0166832 A1* | 8/2004 | Portman ................. H04W 4/00 455/412.1 |
| 2009/0094029 A1* | 4/2009 | Koch ................ H04M 3/42221 704/246 |
| 2013/0211826 A1* | 8/2013 | Mannby .................. G10L 19/00 704/201 |
| 2014/0093059 A1* | 4/2014 | Kanevsky ........... H04M 3/2227 379/202.01 |
| 2016/0065742 A1 | 3/2016 | Nasir et al. |
| 2017/0180558 A1* | 6/2017 | Li ......................... H04M 3/568 |
| 2019/0068389 A1* | 2/2019 | Chitre ................. H04L 12/1863 |

OTHER PUBLICATIONS

P. Mell, et al. *"The NIST Definition of Cloud Computing"*, NIST Special Publication 800-145, Sep. 2011, Gaithersburg, MD.
Wainhouse Research; *"Evaluation of Polycom's Noise Reduction Features—Hands-on testing of two innovative audio capabilities"*; https://www.wainhouseresearch.com; 2016.
Anonymously; "Room Noise Reduction in Audio and Video Calls"; http://ip.com/IPCOM/000251964D; Dec. 12, 2017.
Anonymously; "System for Mitigating Poor Audio Quality during Conference Calls"; http://ip.com/IPCOM/000248829D; Jan. 16, 2017.
Anonymously; "System and Method for Location-Based QoS in Unified Telephony"; http://ip.com/IPCOM/000222398D; Oct. 1, 2012.
Ritcher, C. et al.; "Automated Method of Noise Removal from Multi-Channel Audio"; http://ip.com/IPCOM/000251395D; Oct. 30, 2017.

* cited by examiner

*Primary Examiner* — Sonia L Gay
(74) *Attorney, Agent, or Firm* — Brian Restauro, Esq.; George Blasiak, Esq.; Heslin, Rothenberg, Farley & Mesiti P.C.

(57) ABSTRACT

Methods, computer program products, and systems are presented. The method computer program products, and systems can include, for instance: activating a streaming media recording buffer that records streaming media of an online conference, the online conference having first second and third user online conference participant users; examining data to return an action decision, the examining data to return an action decision including examining data of the streaming media recording buffer to identify an anomalous sound represented in the recorded media stream data of the streaming media recording buffer; returning an action decision based on the examining data to return an action decision, the action decision being an action to mitigate the anomalous sound; and providing one or more output to mitigate the anomalous sound in accordance with the returned action decision.

20 Claims, 12 Drawing Sheets

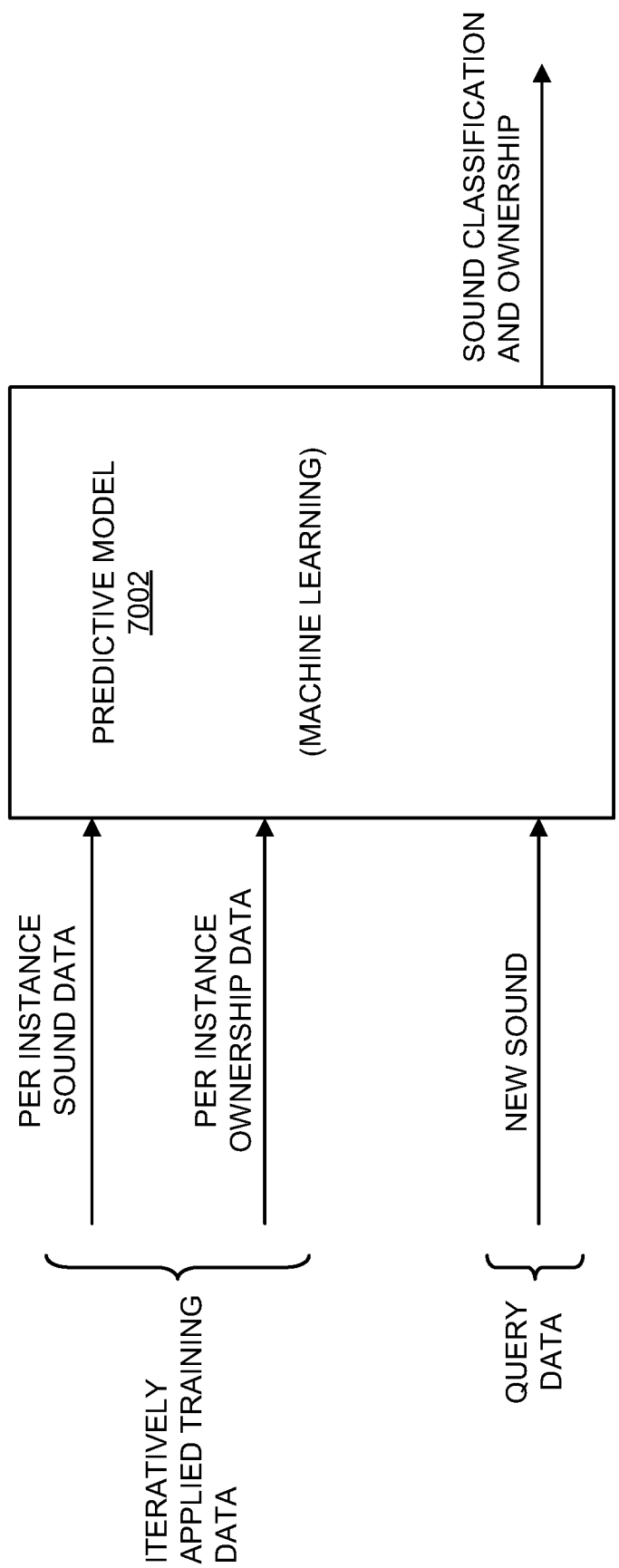

MITIGATING ANOMALOUS SOUNDS

BACKGROUND

Online conferencing systems are widely used to provide collaborative sessions between two or more participants, by allowing the participants to exchange video- and/or audio-content, voice and instant messages, etc. An online conferencing system can be integrated with a variety of collaboration applications, including, for example, media sharing applications, instant messaging applications, video- and audio-streaming applications, and telephony applications.

Data structures have been employed for improving operation of computer systems. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: activating a streaming media recording buffer that records streaming media of an online conference, the online conference having first second and third user online conference participant users; examining data to return an action decision, the examining data to return an action decision including examining data of the streaming media recording buffer to identify an anomalous sound represented in the recorded media stream data of the streaming media recording buffer; returning an action decision based on the examining data to return an action decision, the action decision being an action to mitigate the anomalous sound; and providing one or more output to mitigate the anomalous sound in accordance with the returned action decision.

In another aspect, a computer program product can be provided. The computer program product can include a computer readable storage medium readable by one or more processing circuit and storing instructions for execution by one or more processor for performing a method. The method can include, for example: activating a streaming media recording buffer that records streaming media of an online conference, the online conference having first second and third user online conference participant users; examining data to return an action decision, the examining data to return an action decision including examining data of the streaming media recording buffer to identify an anomalous sound represented in the recorded media stream data of the streaming media recording buffer; returning an action decision based on the examining data to return an action decision, the action decision being an action to mitigate the anomalous sound; and providing one or more output to mitigate the anomalous sound in accordance with the returned action decision.

In a further aspect, a system can be provided. The system can include, for example a memory. In addition, the system can include one or more processor in communication with the memory. Further, the system can include program instructions executable by the one or more processor via the memory to perform a method. The method can include, for example: activating a streaming media recording buffer that records streaming media of an online conference, the online conference having first second and third user online conference participant users; examining data to return an action decision, the examining data to return an action decision including examining data of the streaming media recording buffer to identify an anomalous sound represented in the recorded media stream data of the streaming media recording buffer; returning an action decision based on the examining data to return an action decision, the action decision being an action to mitigate the anomalous sound; and providing one or more output to mitigate the anomalous sound in accordance with the returned action decision.

Shortcomings of the prior art are overcome, and additional advantages are provided, through the provision, in one aspect, of a method. The method can include, for example: receiving from a first online conference participant user reporting feedback data entered using a client computer device of the online conference, the reporting feedback data specifying an anomalous sound occurring within an online conference; responsively to the receiving the reporting feedback data from the first online conference participant user specifying the anomalous sound, prompting second and third user participants of the online conference to enter crowdsourced feedback data respecting the anomalous sound; receiving crowdsourced feedback data from the second and third users; examining the user participant defined feedback data and the crowdsourced feedback data from the second and third users; returning an action decision based on the examining, the action decision being an action to mitigate the anomalous sound; and providing one or more output to mitigate the anomalous sound in accordance with the returned action decision.

In another aspect, a computer program product can be provided. The computer program product can include a computer readable storage medium readable by one or more processing circuit and storing instructions for execution by one or more processor for performing a method. The method can include, for example: receiving from a first online conference participant user reporting feedback data entered using a client computer device of the online conference, the reporting feedback data specifying an anomalous sound occurring within an online conference; responsively to the receiving the reporting feedback data from the first online conference participant user specifying the anomalous sound, prompting second and third user participants of the online conference to enter crowdsourced feedback data respecting the anomalous sound; receiving crowdsourced feedback data from the second and third users; examining the user participant defined feedback data and the crowdsourced feedback data from the second and third users; returning an action decision based on the examining, the action decision being an action to mitigate the anomalous sound; and providing one or more output to mitigate the anomalous sound in accordance with the returned action decision.

In a further aspect, a system can be provided. The system can include, for example a memory. In addition, the system can include one or more processor in communication with the memory. Further, the system can include program instructions executable by the one or more processor via the memory to perform a method. The method can include, for example: receiving from a first online conference participant user reporting feedback data entered using a client computer device of the online conference, the reporting feedback data specifying an anomalous sound occurring within an online conference; responsively to the receiving the reporting feedback data from the first online conference participant user specifying the anomalous sound, prompting second and third user participants of the online conference to enter crowdsourced feedback data respecting the anomalous sound; receiving crowdsourced feedback data from the second and third users; examining the user participant defined feedback data and the crowdsourced feedback data from the second and third users; returning an action decision based on the examining, the action decision being an action to mitigate the anomalous sound; and providing one or more output to mitigate the anomalous sound in accordance with the returned action decision.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7A depicts a predictive model that can be trained using training data by application of machine learning processes.

DETAILED DESCRIPTION

Figure 1:
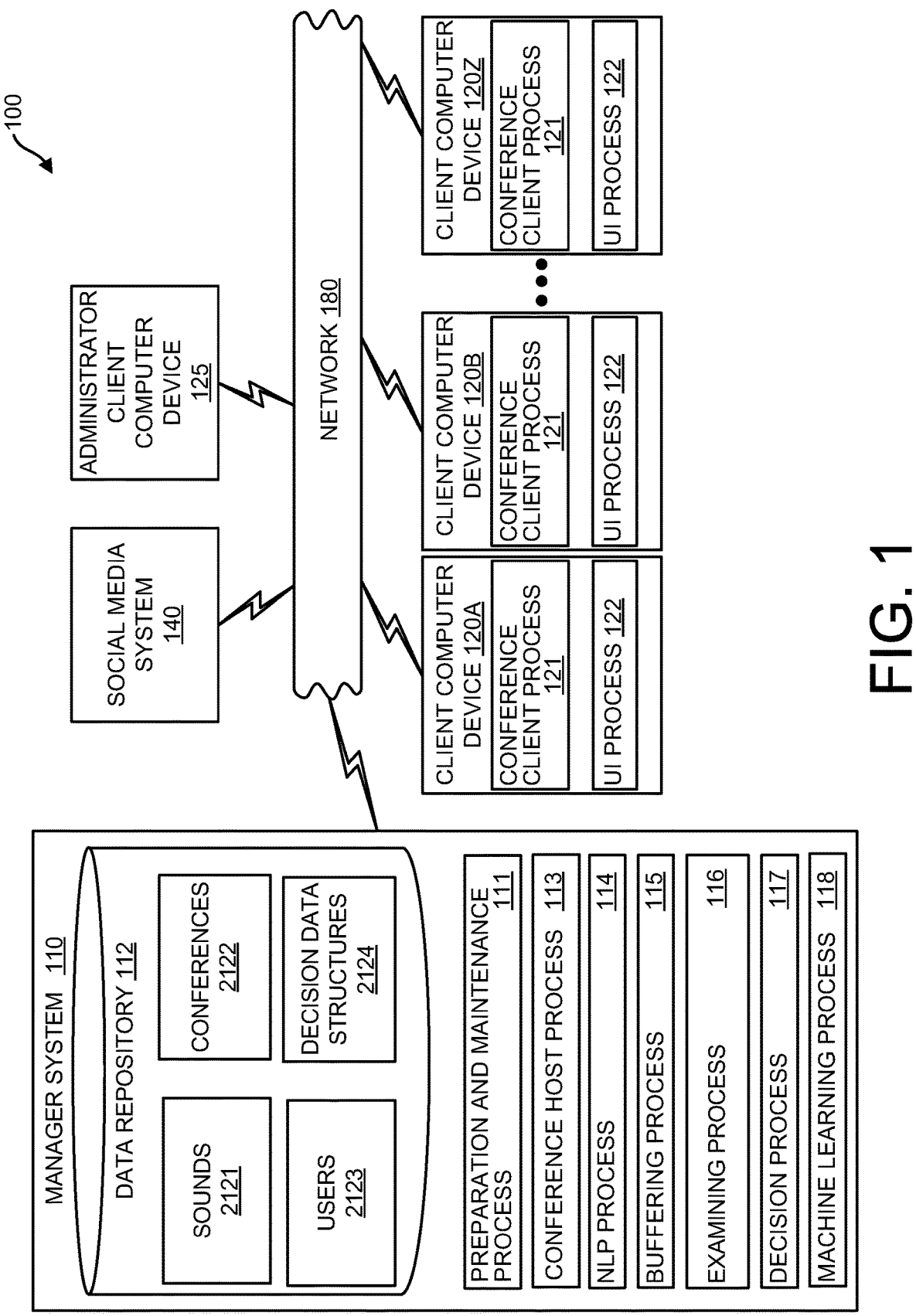
FIG. 1 is a block diagram illustrating a system having a manager system, client computer devices, administrator client computer device, and a social media system according to one embodiment.

System 100 for use in mitigating (e.g. eliminating or reducing) anomalous sounds in in an online conference environment is set forth herein in reference to FIG. 1. System 100 can include manager system 110, client computer devices 120A-120Z, and administrator client computer device 125 and social media system 140. Manager system 110, client computer devices 120A-120Z, administrator client computer device 125, and social media system 140 can be in communication with one another via network 180. Manager system 110, client computer devices 120A-120Z, and administrator client computer device 125, and social media system 140 can be provided by computing node based systems and devices. Network 180 can be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

According to one embodiment, manager system 110, client computer devices 120A-120Z, administrator client computer device 125, and social media system 140 can be external to one another. According to one embodiment, one or more of manager system 110, client computer devices 120A-120Z, administrator client computer device 125, and social media system 140 can be co-located with one another. Client computer devices 120A-120Z can be provided e.g. by smartphones or other types of mobile computing devices, laptops, PCs, and computing node based telephones.

Manager system 110 can include an associated data repository 112 and can run various processes. Manager system 110 can run for example, preparation and maintenance process 111, conference host process 113, natural language process (NLP) process 114, buffering process 115, examining process 116, decision process 117, and machine learning process 118.

Data repository 112 of manager system 110 can store various data. Data repository 112 can store in sounds area 2121 recorded anomalous sounds that can occur during an online conference. The data of sounds area 2121 can store data specifying anomalous sounds, as well as associated data such as conference IDs in which the sounds occurred, and ownership of the sounds (e.g. if the anomalous sound is a dog barking which user's environment originated the sound). Data repository 112 in conferences area 2122 can store data on historical online conferences that have been supported by manager system 110, e.g. specifying such data as IDs for users participating in each conference, the times of the conferences, and anomalous sounds associated with each conference. Data repository 112 in users area 2123 can store data on various users of system 100. Users of system 100 can have associated user IDs and can be registered users of system 100. Data of users area 2123 can include such data as IDs of users of system 100 and a list of conferences, e.g. specified by conference IDs participated in by the various users. Users area 2123 can also store data on preferences of users. Manager system 110 can determine preferences of users by examination of data of social media system 140. Data repository 112 in decision data structures area 2124 can store various decision data structures for use by manager system 110 in returning action decisions. Based on an action decision being made, manager system 110 can provide one or more output for performance of an action that is specified in an action decision.

Manager system 110 running preparation and maintenance process 111 can prepare and maintain data within data repository 112 for support of remaining processes performed by manager system 110. Manager system 110 running conference host process 113 can support functionalities and requirements of an online conference.

For providing online conference functionality, manager system 110 can be configured to operate in accordance with the Realtime Transport Protocol (RTP) which is set forth in Request for Comments (RFC) 3550 published by the Internet Engineering Task Force (IETF) and the Internet Society (ISOC).

Manager system 110 running NLP process 114 can include manager system 110 running processes on unstructured data, e.g. unstructured text, audio, and/or video data to perform e.g. word segmentation, part of speech tagging, parsing, sentence breaking, and/or stemming. Manager system 110 running NLP process 114 can include manager system 110 running processes on unstructured data, e.g. unstructured text, audio, and/or video data to return one or more NLP output parameter can include, e.g. a topic parameter and/or a sentiment parameter. A sentiment parameter can be a bipolar sentiment parameter, e.g. a positive sentiment or a negative sentiment or can be a sentiment specifying one of multiple types of possible non-bipolar sentiments, e.g. "anger", "disgust", "fear", "sadness", and/or "joy". Manager system 110 can run NLP process 114, e.g. to examine social media data of registered users to determine, e.g. topics of interest of the registered users and based on the topics of interest can associate favorite topics to users of system 100 having IDs and associated profiling data stored in users area 2123 of data repository 112.

Manager system 110 running buffering process 115 can activate a media recording buffer defined in a system memory of a computing node of manager system 110 that records content of an ongoing online conference on a rolling time window basis, e.g. in one example system 100 can be configured to maintain a media recording buffered of content of an ongoing online conference of a set duration, e.g. 30 seconds, e.g. which constantly discards content older than the threshold period of time, e.g. 30 seconds from the current instant in time. Manager system 110 running buffering process 115 enables manager system 110 to "look back" in the event that an anomalous sound is reported. For example, in one use case system 100 can be configured to respond in the case that a user observes the sound of a dog barking during the course of an online conference. Embodiments herein recognize for example that at a time that a user wishes to report the sound event of a dog barking on the observance of a dog barking the dog will have already barked by the time the event can be reported Maintaining a rolling time window recorded media buffer allows manager system 110 to examine online conference content occurring prior to a time of reporting of an anomalous sound event such as a dog barking, a siren going off, and the like.

Manager system 110 running examining process 116 can respond to an anomalous sound event, e.g. a dog barking, a siren being energized, construction work with heavy machinery, loud public address announcement, crowd noise, a train passing, and the like. Manager system 110 running examining process 116 can examine user entered data entered into a user interface that can be displayed on a display of a client computer device 120A-120Z and/or data of a streaming media buffer of manager system 110. Based on user feedback data entered into a user interface and/or the recorded buffer stored data, manager system 110 can return an action decision in response to an anomalous sound event. Action decisions can include e.g. muting one or more client computer device, and/or applying one or more audio filter to filter the anomalous sound.

Manager system 110 running decision process 117 can return an action decision in response to examined feedback and/or sound data examined by manager system 110 running examining process 116. Action decisions returned by running of decision process 117 can include, e.g. (a) muting an audio input of a select online conference user to reduce the anomalous sound from an online conference and/or (b) filtering the anomalous sound from an online conference, e.g. by activating and acoustic filter to filter sounds having frequencies of a reported anomalous sound. Manager system 110 running decision process 117 can use one or more decision data structure stored in decision data structures area 2124.

Manager system 110 running machine learning process 118 can, e.g. maintain an evolving corpus of data in data repository 112 for improved active decision and/or can iteratively apply training data to a predictive model that predicts an output based on a received data query.

Figure 2:
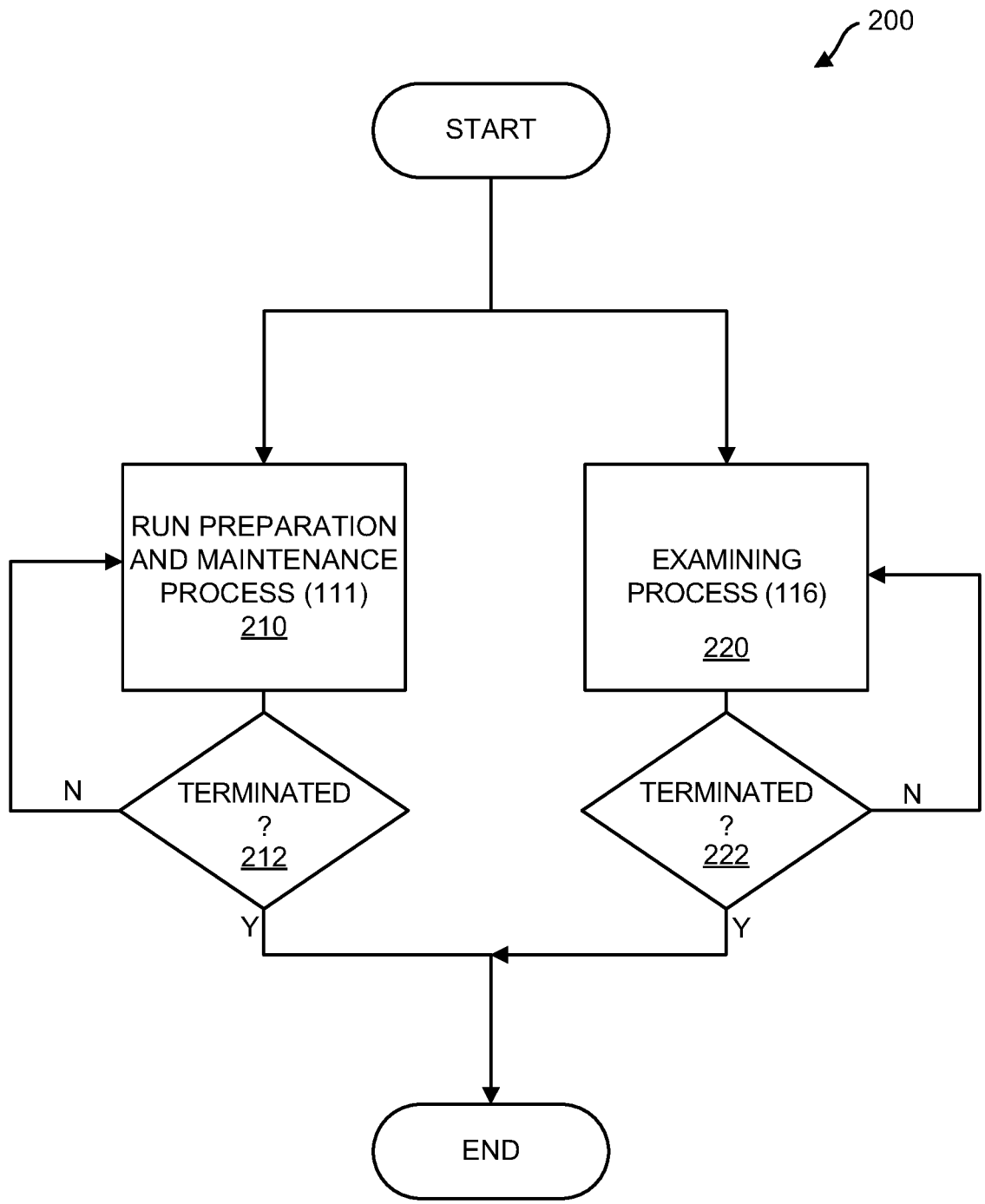
FIG. 2 is a flowchart illustrating a method that can be performed by a manager system according to one embodiment.

FIG. 2 is a flowchart illustrating a method 200 that can be performed by manager system 110. At block 210 manager system 110 can run preparation and maintenance process 111, e.g. to populate, prepare, and/or maintain various data of data repository 112 such as data of sounds area 2121, conferences area 2122, users area 2123, and/or decision data structures area 2124. For performance of preparation and maintenance process 111 manager system 110 can be configured to automatically process data inputs received from client computer devices 120A-120Z, administrator client computer device 125, and/or social media system 140. For example, manager system 110 can be configured to iteratively mine data of social media system 140 to update in users area 2123 preferences of users of system 100. Manager system 110 can run preparation and maintenance process 111 iteratively until preparation and maintenance process 111 is terminated at block 212. At block 220, manager system 110 can run problem report examining process 116. A plurality of instances of problem report examining process 116 can be simultaneously run. Manager system 110 can run problem report examining process 116 until problem report examining process 116 is terminated at block 222. With the performing of problem report examining process 116 iteratively, manager system 110 can be miming associated processes iteratively such as NLP process 114, buffering process 115, decision process 117, and/or machine learning process 118.

Figure 3A:
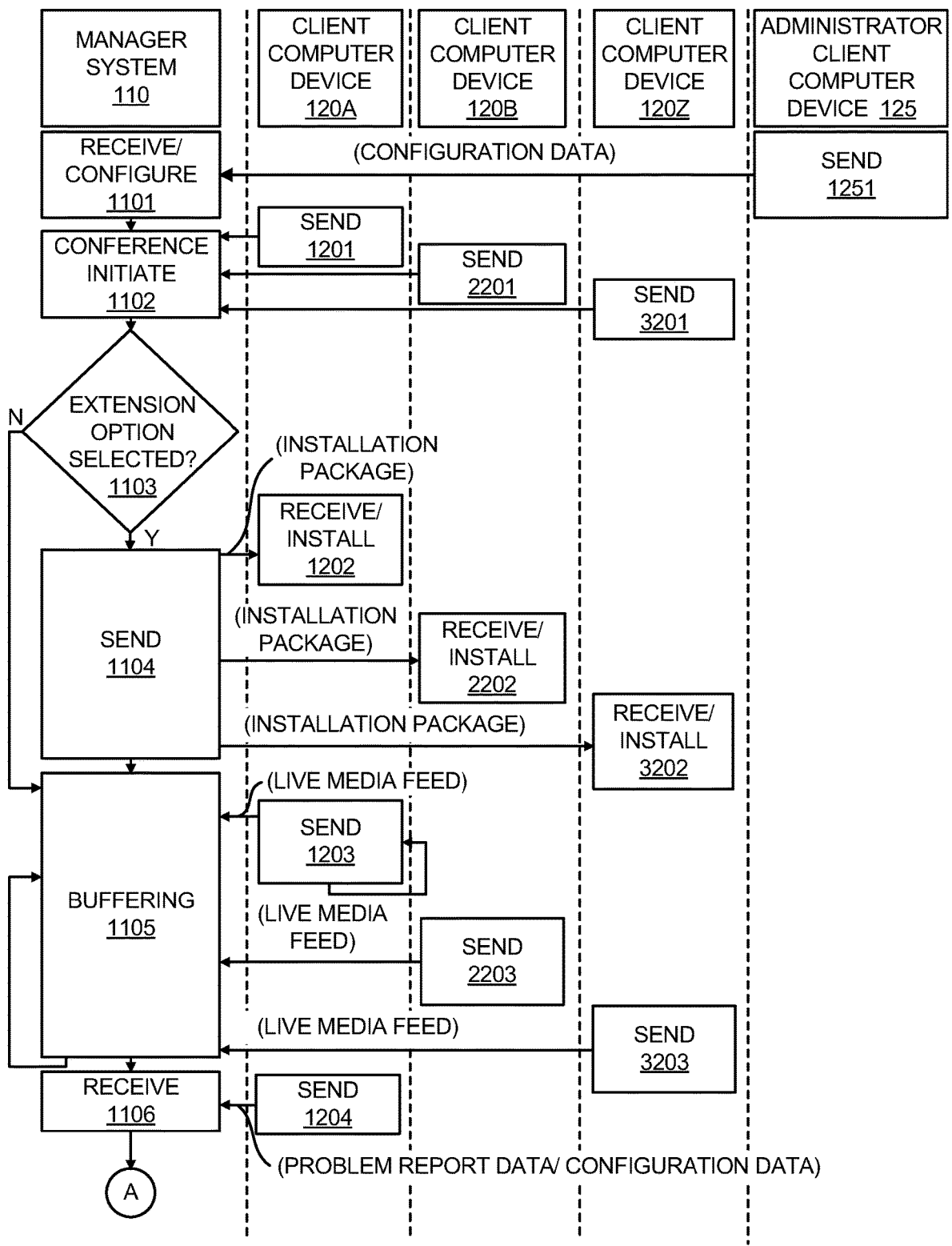
FIGS. 3A-3B are flowcharts illustrating a method that can be performed by a manager system interoperating with client computer devices and administrator client computer devices according to one embodiment.
Figure 3B:
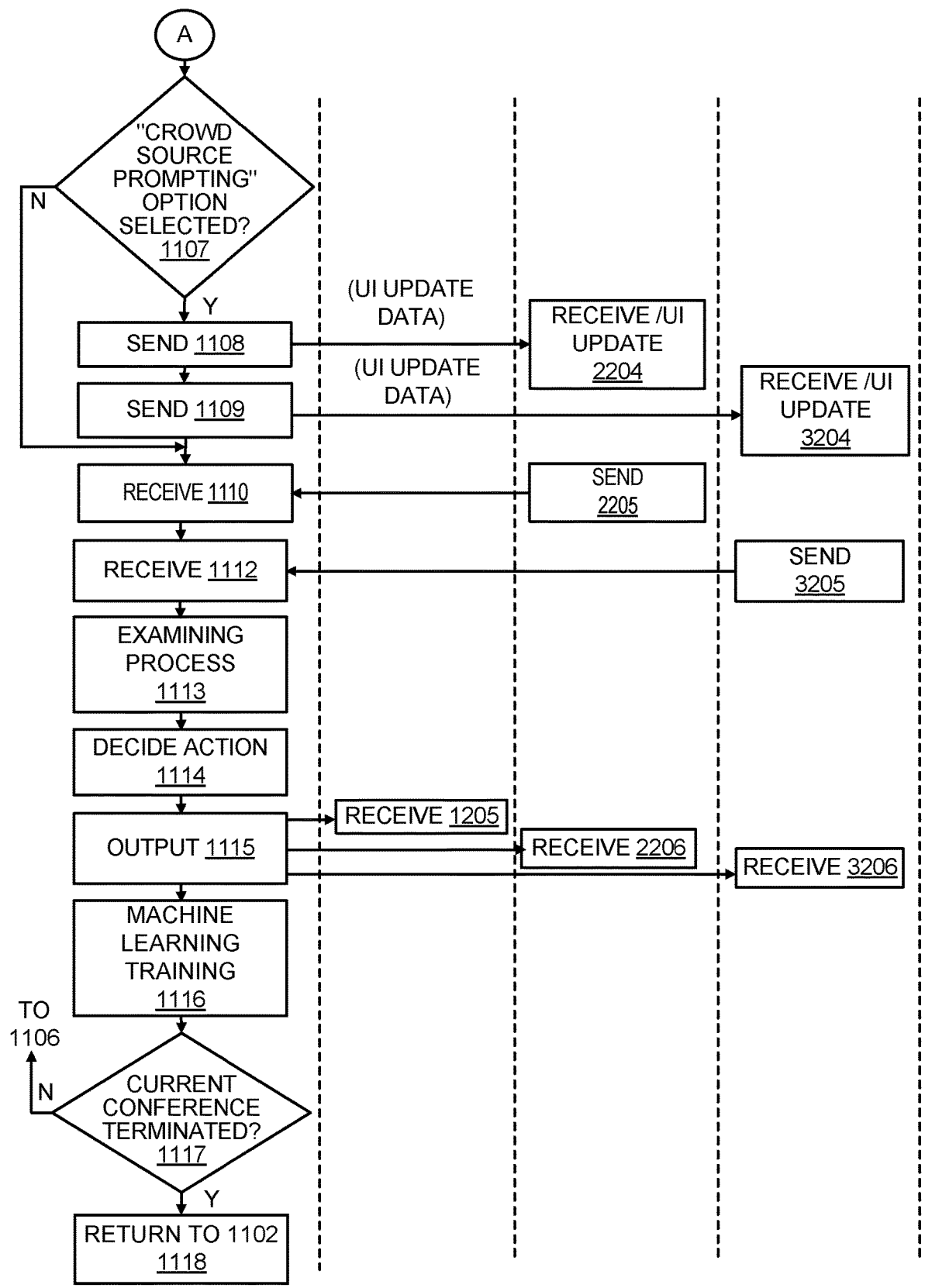

Referring to the flowchart of FIGS. 3A-3B, additional features are described. The flowchart of FIGS. 3A-3B illustrates a method for performance by manager system 110 interoperating with client computer devices 120A, 120B, and 120Z and administrator client computer device 125. At block 1251, administrator client computer device 125 can send to manager system 110 for receipt by manager system 110 at block 1101. In response to receipt of the configuration data, manager system 110 at block 1101 can configure manager system 110 to operate in an administrator configured manner with respect to an online conference to be initiated. Administrator client computer device 125 for example can display an administrator user interface that permits an administrator user to setup options with respect to an online conference to be initiated. Options can include such options as options to permit users in the conference to report sound anomalies to manager system 110 and/or to other users in an online conference. Options can further include options to deselect various options to restrict functionalities of an online conference. For example, administrator defined configuration data received at block 1101 can specify that features for examination and profiling of anomalous sounds normally available are not to be active for a particular upcoming online conference to be initiated. Administrator defined configuration data can alternatively specify that features for examination and profiling over to be active for an upcoming conference.

Continuing with reference to the flowchart of FIGS. 3A-3B, manager system 110 at block 1102 can initiate a conference. At blocks 1201, 2201, and 3201 respectively, client computer devices 120A, 120B, and 120Z can be sending conference registration and initiation data for receipt by manager system 110 at block 1102. Conference initiation at block 1102 can be compliant with a Realtime Transport Protocol (RTP) aspects of which are set for at RFC 3550. At block 1102 manager system 110 can present to users of client computer devices 120A, 120B, and 120Z, through user interfaces thereof an option to select an extension to a current online conference client application running on a respective client computer device 120A, 120B, and 120Z. The extension when selected for installation can augment functionalities of the online conference client applications running on client computer devices 120A, 120B, and 120Z to facilitate augmented functionalities, e.g. augmented functionalities so that anomalous sounds can be mitigated (e.g. removed or reduced) within an online conference. In some embodiments, users of one or more of client computer devices 120A, 120B, and 120Z may have previously selected an option for such an extension, e.g. prior to an earlier online conference and so one or more of the respective client computer devices in some cases may already be provisioned for the enhanced functionality described herein, permitting e.g. reporting and mitigating of anomalous sounds. At block 1103, manager system 110 can determine whether an extension option has been selected and if yes, can proceed to block 1104. At block 1104, manager system 110 can push installation packages to various client computer devices of client computer devices 120A, 102B, and 120Z for provisioning such devices for enhanced functionality, e.g. functionality for sound anomaly reporting and mitigating as set forth herein.

Referring to block 1104, manager system 110 can send installation packages to client computer devices 120A, 120B, and 120Z designated for receipt of the installation packages. At block 1104 manager system 110 can send to client computer device 120A for receipt by client computer device 120A at block 1202, an installation package. Manager system 110 at block 1104 can send to client computer device 120B for receipt by client computer device 120B at block 2202 an installation package. Manager system 110 at block 1104 can send to client computer device 120Z for receipt by client computer device 120Z at block 3202, an installation package. The installation packages received at blocks 1202, 2202, and 3202 respectively can include installation packages so that the respective client computer devices 120A, 120B, and 120Z are provisioned to operate in accordance with functionalities as set forth herein, including functionalities to facilitate reporting and mitigating of anomalous sounds within an online conference. Installation packages received at blocks 1202, 2202, and 3202 can be installed on the respective client computer devices on receipt thereof and include, e.g. libraries and executable code that provision the respective client computer devices to operate in accordance with anomalous sound reporting functionalities and anomalous sound mitigating functionalities as set forth herein.

Client computer devices 120A, 120B, and 120Z can run conference client process 121. Conference client process 121 can facilitate baseline operation in accordance with functions of an online conference, e.g. can provision client computer devices 120A, 120B, and 120Z so that the respective client computer devices are configured to operate in accordance with the RTP which is set forth in RFC 3550.

With the installation package downloads received at blocks 1202, 2202, and 3202 respectively, client computer devices 120A, 120B, and 120Z respectively are able to further run UI process 122, which is a process that allows users of client computer devices 120A, 120B, and 120Z to report anomalous sounds and which can further provision respective client computer devices 120A, 120B, and 120Z so that client computer devices 120A, 120B, and 120Z are able to mitigate anomalous sounds being transmitted within an online conference.

On completion at block 1104, manager system 110 can proceed to buffering block 1105. Also in the case that the extensions option is not selected (block 1104) manager system 110 can bypass block 1104 and proceed to buffering block 1105 (e.g. in the case that a noted installation package has been previously downloaded and installed on respective client computer devices of a current online conference).

At buffering block 1105, manager system 110 can buffer transmitted media streams being transmitted during an online conference on a rolling time window basis. The buffered media streams can include buffered audio streams and/or video streams. Manager system 110 can maintain a recording buffer for performing buffering block 1105 so that all media streams transmitted during a rolling buffer recording period can be recorded into a recording buffer to reduce resource consumption overhead. A media stream recording buffer of manager system 110 can be a restricted size and need not record media streams of excessive length. For example, according to one embodiment buffering at block 1105 can provide a recording buffer that records media streams of 30 seconds so that media stream content older than 30 seconds with respect to the current time can be continuously discarded from the rolling time window media stream recording buffer.

Referring to block 1105, client computer devices 120A, 120B, and 120Z can be iteratively sending live media streams originating from the respective client computer devices. The live media streams iteratively transmitted at blocks 1203, 2203, and 3203 can include, e.g. live audio streams and/or live video streams, and can be recorded into a media stream recording buffer of manager system 110 on receipt. If the recording buffer reaches its limit, e.g. has stored media stream data of longer than a set time, e.g. 30 seconds, the recording buffer can automatically discard the older content so that at all times in accordance with the recording buffering function depicted at block 1105, the recording buffer only contains media stream content from client computer devices 120A, 120B, and 120Z that has not aged beyond a set limit e.g. all content 30 seconds or older can be discarded from the media stream recording buffer on a rolling time window basis.

Recording buffer functionality depicted at block 1105 facilitates operation of manager system 110 so that manager system 110 is able to respond to anomalous sound events which have occurred in the immediate past, but which can occur too quickly to reasonably permit a user to report in real-time prior to the event ceasing. For example, in accordance with functionalities set forth herein, a user may hear in a live online conference the sound of a dog barking and may wish to report the anomalous sound. However, by the time that a user notices the sound and decides to report it, the dog may have already discontinued barking. Providing recording buffering at block 1105 allows examining of an anomalous sound that has occurred in the immediate past prior to the reporting of the anomalous sound by a user participant in an online conference. Providing recording buffering at block 1105 facilitates the storing of representations of anomalous sounds for later use. For example, manager system 110 can store a recorded representation of an anomalous sound identified in a first conference, and can examine that data in a subsequent decision for returning improved action decisions.

Buffering of conference live media data at block 1105 can be ongoing and continuous through an active period of an online conference. At block 1204, a user of a client computer device of client computer devices 120A-120Z can report a problem such as an anomalous sound problem. With user defined problem data, a client computer device, e.g. client computer device 120A can send configuration data for receipt by manager system 110 at block 1106. User defined problem report data and configuration data sent at block 1204 can be defined by a user using a user interface 400 as set forth in FIG. 4.

Figure 4:
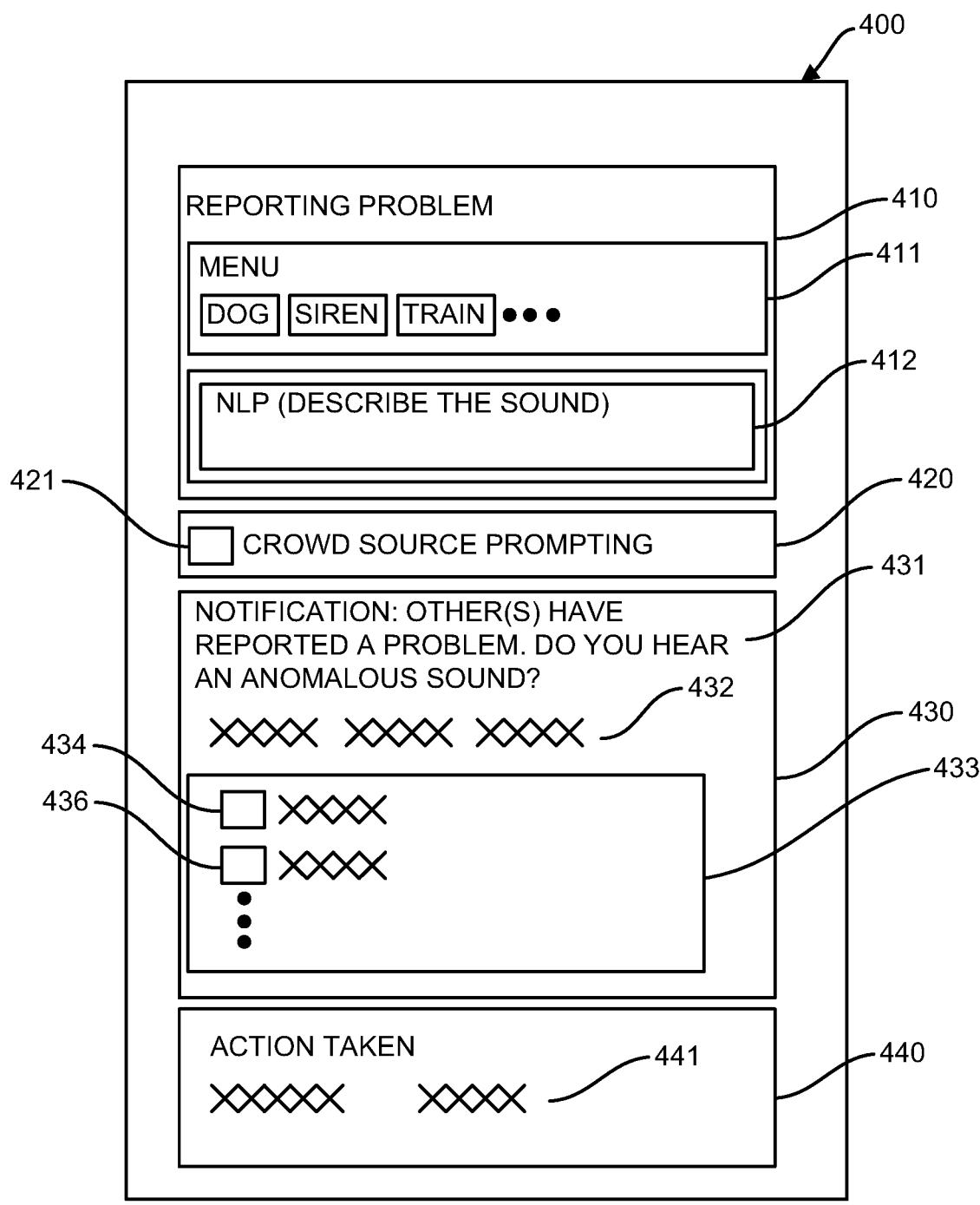
FIG. 4 depicts a user interface that can be displayed on a display of a client computer device according to one embodiment.

A user interface 400 as set forth in FIG. 4 facilitates defining by a user problem report data and configuration data such as configuration data specifying whether a "crowdsource prompting" option is active. In area 410 of user interface 400 a user can define data that reports an anomalous sound problem, e.g. a sound observed by a user that is distracting or atypical such as e.g. a dog barking, a siren being energized, construction work with heavy machinery, loud public-address announcement, crowd noise, a train passing, and the like. Referring to area 411 of area 410 of user interface 400, a user can select from a generated menu to identify the anomalous sound being heard. In the embodiment of FIG. 4, various menu options are displayed in area 411, such as "dog", "siren", "train", and recitational options can be displayed with icons in area 411, which a user may select. In area 412 a user of user interface 400, can simply type text data indicating the anomalous sound being heard, e.g. can type the text for example "I HEAR A DOG BARKING IN THE CONFERENCE" or "I HEAR A SIREN IN THE CONFERENCE" and so forth.

Using area 420 in area 421, e.g. by entering "Y" in area 421, a user can activate a "crowdsource prompting" option, which when selected results in manager system 110 in response to receipt of data from a first user specifying an anomalous sound, sending notifications with prompts to remaining conference user participants specifying that a first user has reported an anomalous sound problem and prompting remaining conference user participants to provide crowdsourced feedback respecting the anomalous sound.

A first user using areas 420 and 421 can select a crowdsource prompting option resulting in a prompt for crowdsourced feedback being sent to remaining conference participant users responsively to the first user reporting a problem. Presenting a prompt for crowdsourced feedback to other participant users of a live online conference can in some cases expedite resolution of a problem. On the other hand, a user using user interface 400 can in some instances wish to not distract other participant users of a conference by presenting them with a prompt for crowdsourced feedback. Manager system 110 can be configured so that users of system 100 when not prompted to provide crowdsourced feedback regarding an anomalous sound can nevertheless provide unprompted for feedback regarding an anomalous sound using a user interface of their respective client computer device.

In area 430, user interface 400 can present to a user a text based notification that another user participant of a current conference has reported an anomalous sound problem. That is, area 430 can be active when at least one other user has selected a crowdsource prompting in their version of areas 420 and 421, that notifications about a reported problem should be sent to other participant users. In area 430 there can be presented a text based message 431 indicating that at least one other user has reported an anomalous sound problem. In area 432, user interface 400 can display variable text data. In areas 433, 434, and 436 user interface 400 can present text based data and/or options prompting the user of user interface 400 to enter information about an anomalous sound observed by another user.

In area 440, user interface 400 can present a text based message indicating actions that have been undertaken by manager system 110 to reduce a reported anomalous sound that has been reported by at least one participant user of system 100.

With further reference to the flowcharts of FIGS. 3A-3B, manager system 110 at block 1107 can determine whether an "crowdsource prompting" option has been selected using user interface 400 of at least one client computer device of client computer devices 120A-120Z.

A problem can be reported by a first user specifying user defined problem report data and configuration data at block 1204 for receipt by manager system 110 at block 1106. The configuration data with such sending can include option selections entered by a user using a user interface 400, such as options specifying whether a prompt to enter crowdsourced feedback is to be others regarding a user's report of an anomalous sound. With the configuration data sent at block 1204, there can be included configuration data the specifies that a prompt to enter crowdsourced feedback is to be sent responsively to receipt of anomalous sound reporting data by the first user.

Still referring to the flowchart of FIGS. 3A-3B, manager system 110 at blocks 1108 and 1009 responsively to the problem report data received at block 1106, can send user interface update data to client computer devices 120B and 120Z for receipt by client computer devices 120B and 120Z at respective blocks 2204 and 3204. Operation of reporting block 1204 in which a first user initiates the sending of user defined report data and configuration data and notification blocks 2204 and 3204, in which second and third users are presented user interface 400 update with prompts to enter crowdsourced feedback respecting the first user's report of an anomalous sound are described in reference to FIG. 5, showing user interfaces 400 of client computer devices 120A, 120B, and 120Z working together in a coordinated manner.

Figure 5:
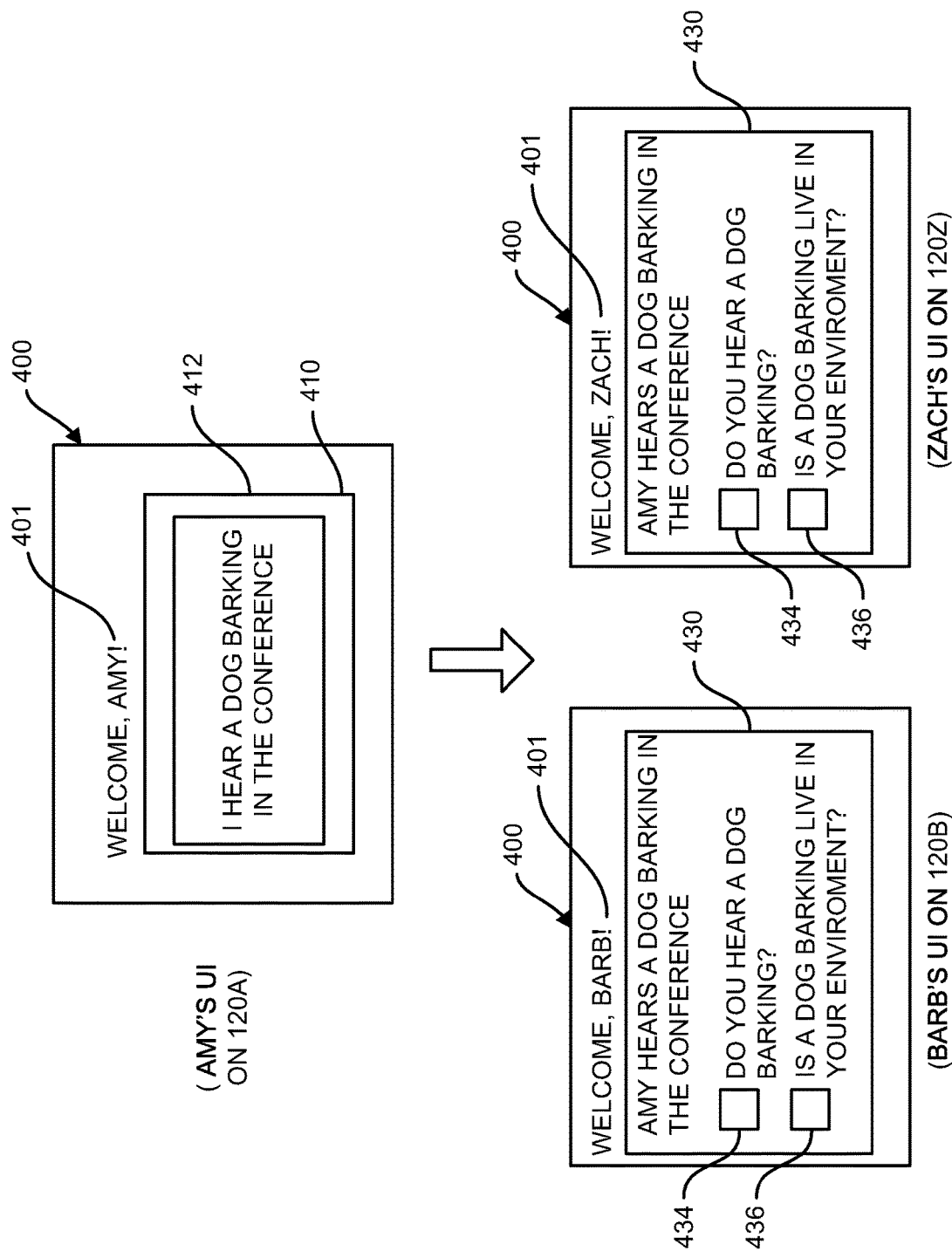
FIG. 5 depicts multiple user interfaces being presented on multiple difference client computer devices for illustrating or prompting a crowd-sourced feedback feature according to one embodiment.

Referring to FIG. 5, a first user Amy can be using client computer device 120A that displays user interface 400 and includes the greeting "WELCOME AMY". In area 410 and area 420 Amy can type in the text based message "I HEAR A DOG BARKING IN THE CONFERENCE". Manager system 110 running NLP process 114 can responsively segment the text entered data and can output NLP parameters such as topic classifiers for the entered text based message, entered into area 412. Responsively to its examination of the entered text based message, manager system 110 can at blocks 1108 and 1109 provide updated user interface data for user interface 400 displayed on client computer device 120B (Barb's device) and on user interface of client computer device 120Z (Zach's device) in response to receive of the UI update data at blocks 2204 and 3204 respectively. User interface 400 of Barb and Zach's respective devices are depicted in FIG. 5. User interface 400 displayed on Barb's client computer device 120B can display in area 410 "WELCOME BARB". In area 430 of user interface 400 there can be displayed the text based notification "AMY HEARS A DOG BARKING IN THE CONFERENCE" and can present in areas 434 and 436 menu options prompting Barb to enter information about the anomalous sound reported by Amy. In area 434, Barb can respond to the question "DO YOU HEAR A DOG BARKING?" and in area 436 Barb can respond to the question "IS A DOG BARKING LIVE IN YOUR ENVIRONMENT?". The same text based data can be displayed on Zach's client computer device 120Z, except that Zach's user interface 400 can have the differentiated greeting "WELCOME ZACH" instead of "WELCOME BARB". Zach, like Barb, can be prompted with areas 434 and 436 to input data indicating whether Zach hears a dog barking and whether there is a dog barking live in Zach's environment.

In area 434 of user interface displayed on Zach's client computer device 120Z, Zach can respond to the question "DO YOU HEAR A DOG BARKING?" and in area 436, Zach can respond to the question "IS A DOG BARKING LIVE IN YOUR ENVIRONMENT?". The responsive user defined data defined by a user using user interface 400 of client computer device 120B (Barb), and 120Z (Zach) can be sent at blocks 2205 and 3205 respectively for receipt by manager system 110 at blocks 1110 and 1112 respectively.

Manager system 110 can at examining block 1113 responsively process the problem reporting data reported by the first user, Amy, in the described scenario at block 1204 and the responsive user defined data defined by Barb and Zach and sent at blocks 2205 and 3205 respectively. Manager system 110 at examining block 1113 can perform examining to determine which user's live environment initiated the anomalous sound reported at block 1204.

Manager system 110 can perform various processes to determine which user's environment originated the anomalous sound. For example, manager system 110 for performing examining at block 1113 can examine feedback data including prompted for crowdsourced feedback data input by users of client computer devices 120A-120Z for determining which user's environment originated the anomalous sound. Referring to FIG. 5, manager system 110 in the described scenario can examine crowdsourced feedback data input by Barb into area of client computer device 120B and can examine crowdsourced feedback data input into area 430 by Zach in Zach's client computer device 120Z. In one use case in reference to FIG. 5, Barb can enter into Barb's user interface in area 436 data indicating that a dog is not barking in Barb's live environment. However, Zach using area 436 of Zach's user interface 400 can indicate that a dog is barking in Zach's live environment. Manager system 110 under such a scenario by examining input data input into areas 430 of Barb and Zach's respective user interfaces 400 can determine that Zach's client computer device 120Z is the client computer device from which the anomalous sound originated.

In response to such determining, manager system 110 according to one embodiment at block 1114 can decide appropriate action. In one embodiment the appropriate action can be "muting" Zach's client computer device 120Z, so that Zach's client computer device 120Z is restricted from providing an audio input into an online conference. Manager system 110 can cause muting by providing one or more output at block 1115. An output at block 1115 can include sending a communication for receipt by Zach's client computer device 120Z at block 3206 and in response to which, Zach's client computer device 120Z can activate a mute function so that client computer device 120Z is restricted from entering audio input into a live online conference that is currently active.

The applied mute control, according to one embodiment can be a dynamic mute control that is deactivated in response to a client computer device user, i.e. Zach in the described scenario speaking. In other words, the mute function can become automatically deactivated when Zach begins to speak. Client computer device 120Z can be configured so that Zach's client computer device 120Z can automatically become unmuted in response to Zach commencing speaking. In some use cases, in such a scenario the anomalous sound, e.g. a dog barking might be overheard when Zach is speaking. However, the anomalous sound is substantially removed from remaining time periods of the conference given that client computer device 120Z is normally on mute and in the described scenario can only unmute itself when Zach commences speaking.

In the described scenario manager system 110 can determine that Zach's client computer device 120Z is the client computer device producing the anomalous sound based on Zach entering user defined data in area 430 of Zach's user interface 400 (FIG. 5) specifying that Zach's environment is producing the anomalous sound. In another embodiment, manager system 110 can determine that Zach's environment is producing an anomalous sound without Zach expressly entering prompted for feedback data indicating that Zach's environment is producing an anomalous sound. In fact, Zach may be hesitant to expressly enter data specifying that Zach's environment is the source of the problem. In the use case described, manager system 110 can determine by a process of elimination that Zach's environment is producing an anomalous sound based only on Amy and Barb's entered feedback data where Amy and Barb's entered feedback data each indicates that a dog barking sound is being heard within an online conference audio content. In such a use case, manager system 110 need not wait for Zach to enter data indicating that Zach's environment is producing the anomalous sound, but can infer that Zach's environment is producing the anomalous sound based on Amy's entered feedback data in combination with Barb's entered feedback data. Embodiments herein recognize that a user participant of an online conference residing in an environment producing anomalous sound may be hesitant to report that such a user is in the environment producing the anomalous sound.

In reference to FIG. 5 a displayed user interface can be used to obtain crowdsourced feedback from remaining users. In another embodiment the described user interface can in addition or alternatively be based on Dual Tone Multi-Frequency Signaling (DTMF), wherein for entering feedback, reporting users and remaining users enter feedback using a DTMF based menu. According to one embodiment, manager system 110 can modify an audio conference to enable a DTMF tone menu to trigger a crowdsource polling mechanism (functionality described with reference to client computer devices 120A, 120B, and 120Z of FIG. 5 except with use of a DTMF menu. Once the system gathers enough data points from the "crowd" it can then use that data to narrow down and potentially identify the line (or source) of the audio problem. The system can then e.g. automatically mute that person's client computer device.

According to one example using a DTMF menu for obtaining feedback, five user participants can be on a audio conference bridge, Tom, Craig, Sherie, Amber and Mike. Mike is at the airport and forgets to hit mute, walks up to a gate counter, sets his phone on the ledge while he talks to the gate agent. Meanwhile the other four people's conversation is interrupted by a loud airport announcement. Tom as the bridge owner presses *88 to initiate a crowdsource poll to identify the problem. Everyone who hears the problem but knows that its not coming from their own speakers presses *8. Mike is the only line that doesn't press *8 because he doesn't hear the question (since the phone is down) and the system then records the audio issue and mutes Mike's line (the only line that didn't respond). There is set forth herein according to one embodiment, a method to identify undesirable sounds via crowdsource tagging. In this method according to one embodiment the system can configure a DTMF sequence that will e.g. open up a vote (prompted) from other participants or is always available for participants to initiate (unprompted). Either way the user decides when an anomaly or undesirable sound has occurred and then presses the button sequence to signal the event. In some embodiments system 100 can be configured to automatically identify anomalous sounds independent of any received feedback from any user.

According to one embodiment, manager system 110 can at the initiation of a conference at block 1105 begin recording an N second (e.g. 30) rolling window of audio. Users can hear an undesirable sound. A Conference owner or participant can initiate a solicited vote (e.g. as illustrated in FIG. 5 except using a DTMF menu) to the entire list of participants (e.g. by appropriate control of a displayed user interface or DTMF user interface pressing ** (or similar sequence)). User(s) presses the predefined button sequence to vote—or indicate that they also hear the anomaly. Manager system 110 can look for patterns and a process of elimination to determine which client computer device(s) the audio issue could be occurring on. Once one is found manager system 110 either mutes the client computer device originating the anomalous sound or applies an audio filter if appropriate. The identified anomalous sound can be stored into data repository 112 in sounds area 2121. On subsequent calls according to one embodiment, the filtering and/or muting of the client computer device producing the anomalous sound can be initiated whenever that sound was reproduced again automatically (e.g. without any collected feedback from any participant user).

In the embodiment described with reference to FIG. 5, manager system 110 can automatically present prompts to remaining user participants of an online conference in response to a first user, e.g. Amy in the described scenario reporting an anomalous sound. It will be seen that the functionalities described with reference to FIG. 5 can result in mitigating an anomalous sound even without buffering at block 1105 being active and even without manager system 110 having a record buffer. That is, manager system 110 can decide to mute a client computer device simply based on data returned from participant users of a conference specifying whether an anomalous sound is live in their environment without processing of data of a media stream recording buffer of manager system 110 e.g. without identifying any anomalous sound recorded in a media stream recording buffer of manager system 110. In another embodiment, processing at examining block 1113 in the use case that manager system 110 processes feedback data from an anomalous sound reporting user and crowdsourced feedback data in response to a prompt for crowdsourced feedback data based on the "crowdsourced feedback" option being selected can include manager system 110 processing data of media stream buffer e.g. to identify an reported anomalous sound and to match the identified recorded sound of a current online conference to a previously registered anomalous sound. While system 100 can provide anomalous sound mitigation content recording streaming media content into a rolling time window buffer, buffering at block 1105 can provide various advantages. For example, as noted buffering at block 1105 facilitates comparing of an anomalous sound of a current conference to a previously recorded sound of a prior conference to facilitate improved decision making. Further, buffering at block 1105 can facilitate the storage of a representation of anomalous sound occurring in a current conference into data repository 112 for later use by manager system 110 in accurate decision making in a subsequent conference.

There is set forth herein according to one embodiment, a system and method to tag problem audio through crowdsourcing and according to one embodiment automatically mitigate those sounds e.g. through muting and/or filtering in subsequent calls. Embodiments herein can address a problem of not being able to identify the source of anomalous sounds in an audio conference call. Embodiments herein recognize that an anomalous sound can be heard on the conference and in some scenarios no one can tell where its coming from. Sometimes people leave their phones unmuted, and other times there is static or echo's that no one is aware of Embodiments herein can identify the source of an anomalous sound and mitigate it (e.g. remove or reduce it).

Embodiments herein include a method to identify undesirable sounds via crowdsource tagging crowdsourced feedback can be prompted or unprompted. A method can include applying a known noise filters to subsequent calls. Embodiments herein can include crowdsourcing to identify where a sound is coming from and selectively filter that sound from the conference. The system modifies an audio conference system to enable a DTMF tone to trigger a crowdsource polling mechanism. Once the system gathers enough data points from the "crowd" it then uses that data to narrow down and potentially identify client computer device the audio problem. The system can then e.g. automatically mute that person's client computer device.

With further reference to the flowchart of FIGS. 3A and 3B, additional processes can be performed for mitigation of anomalous sounds in an online conference.

In reference to the user interface 400 as shown in FIG. 4, a certain user participant of an online conference with appropriate controls using areas 420 and 421 can de-select the crowdsource prompting option in which case remaining participant users of a conference will be restricted from receiving a prompt to enter crowdsourced feedback regarding an anomalous sound is being reported by the certain participant users. In such a use case, manager system 110 can be restricted from prompting remaining users of an active online conference to enter crowdsourced feedback data in response to a first user reporting an anomalous sound.

In one use case with reference to the user interface 400 as shown in FIG. 4, a user can use area 410 to specify an anomalous sound being observed and using areas 420 and 421 can de-select a crowdsourced prompting option. Accordingly, manager system 110 can refrain from prompting other users to enter feedback data regarding the anomalous sound observed by the first user. Instead, in such a scenario manager system 110 can perform processing to determine an identification of the sound without reliance on prompted for crowdsourced of other users as set forth in reference to the example of FIG. 5 (though other users may elect to enter unprompted crowdsourced feedback).

Where a user de-selects crowdsourced feedback options using areas 420 and 421 of user interface 400, manager system 110 at decision block 1107 can bypass send blocks 1108 and 1109 and can proceed directly to blocks 1110 and 1112, described in the flowchart of FIGS. 3A and 3B and then can proceed to examining block 1113 to examine data of the current online conference to attempt to determine an identification of a reported anomalous sound.

Referring to send blocks 2205 and 3205 in the described scenario users of client computer devices 120B and 120Z can in some instance elect without being prompted to enter crowdsourced data regarding anomalous sounds being observed during a conference. Such un-prompted for crowdsourced data can be examined at block 1113 for providing an action decision at block 1114. An action decision can be triggered for example based on a confidence level associated with the condition (e.g. a determined sound classification) and manager system 110 can increase a confidence level associated with a classification based on received crowdsourced feedback data consistent with the classification.

According to one embodiment as set forth herein, manager system 110 can return an action decision at block 1114 regarding an anomalous sound based on unprompted feedback by other users indicating that the anomalous sound has been observed by others. For example, according to one embodiment, an action decision returned at block 1114 can be conditionally based on more than one user of an online conference having observed and reported to manager system 110 a common anomalous sound (which can increase a confidence level associated to a classification). Examining at block 1113 by manager system 110 can include processing to determine an identification of an anomalous sound.

Continuing with reference to the flowchart of FIGS. 3A and 3B manager system 110 at examining block 1113 in addition or alternatively to examining feedback data of users (prompted or unprompted) can examine recorded streaming media sound data of a streaming media recording buffer of manager system 110 subject to buffering at block 1105.

The streaming media recording buffer of manager system 110 provides for lookback into anomalous sounds occurring in the immediate past. According to one example, there can be four participant users on a conference bridge and most are hearing an odd sound that occurs periodically. Manager system 110 can be recording the call on a 30 second rolling time window basis into a media recording buffer of manager system 110. Three of the participants press the predefined DTMF key  (configured for reporting an anomalous sound) when they hear the anomaly. Manager system 110 can then examine the audio from 10 seconds prior to the time each participant pressed the  sequence and looks for any audio anomalies. If it finds one then it can tag it and if it hears it again it will apply a filter to it.

According to one example, manager system 110 at block 1105 can initiate recording an N second (e.g. 30) rolling window of audio into a media stream record buffer of manager system 110. One or more user can hear an undesirable sound. One or more users presses the predefined button sequence to tag an event (e.g. crowd noise event, dog barking, siren). Manager system 110 can examine the recorded audio up to N seconds prior to the tagged event and begins analyzing that segment for any audio anomalies. Once one is found manager system 110 can apply an audio filter to filter the sound from future audio in the current online conference and can store a record of the anomalous sound into sounds area 2121 of data repository 112. Manager system 110 can use the stored record of the anomalous sound for improving anomalous sound mitigation action decisions in subsequent conferences.

Continuing with the flowchart of FIGS. 3A-3B manager system 110 can receive user defined problem report data indicating that a dog is barking but, at the time of the receipt, the dog may not be currently barking and so manager system 110 can examine data stored in a media stream recording buffer of manager system 110 to examine recorded sounds occurring within an online conference in the past, e.g., just prior (within the time of the buffer to the time of the reporting). For performing examining at block 1113, manager system 110 can identify an anomalous sound by examining data of the media stream recording buffer.

Manager system 110 at examining block 1113 can identify an anomalous sound based on frequencies of sounds identified in the media stream recording buffer of manager system 110. For example, human voice sounds can have frequencies within a first range and thus manager system 110 at examining block 1113 can tag sounds having frequencies outside of the first range as anomalous sounds. Manager system 110 can tag sounds as anomalous sounds based on one or more such criterion being satisfied and can compare an identified anomalous sound to previously registered anomalous sounds. Manager system 110 can classify an identified anomalous sound as belonging to a classification of a prior registered anomalous sound and/or can register a newly identified anomalous sound as a new anomalous sound. Manager system 110 in some embodiments can apply a sound quality criterion when registering a new anomalous sound into sounds area 2121 of data repository 112.

Anomalous sounds can include such sounds as e.g. a dog barking, a siren being energized, construction work with heavy machinery, loud public-address announcement, crowd noise, a train passing, and the like. Based on an anomalous sound being identified at examining block 1113, manager system 110 at examining block 1113 can compare the identified anomalous sound to prior-registered anomalous sounds. On the deployment of system 100, sounds area 2121 of data repository 112 can be configured to include a plurality of pre-registered anomalous sounds taken from a variety of sources, which include, e.g., an external sounds database of signature anomalous sounds. Through the course of deployment of system 100, additional sounds can be added to sounds area 2121 of data repository. For example, manager system 110 can be configured so that, manager system 110 can log into sounds area 2121 anomalous sounds identified during an online conference. Manager system 110 at examining block 1113 can match the sound from a current conference to a previously-registered anomalous sound of sounds area 2121.

For performing matching, manager system 110 can perform pattern recognition processing using one or more of, e.g., feature extraction algorithms, classification algorithms and/or clustering algorithms to perform matching of an anomalous sound identified in a current online conference to a previously-registered anomalous sound stored in sound area 2121 of data repository 112.

For performing matching, manager system 110 need not identify an identical match but rather, e.g., can return a match based on confidence level of a determined match exceeding a threshold. manager system 110 for performing matching at examining block 1113 can compare an identified anomalous sound of a current online conference to each prior-registered anomalous sounds of sounds area 2121 of data repository 112 and, according to one embodiment, can compute a dissimilarity score for each prior-registered anomalous sound, and can select the prior registered sound having the lowest dissimilarity score as the matching sound. Classification algorithms can employ e.g. linear discriminant analysis, quadratic discriminant analysis, maximum entropy classification analysis, K-nearest neighbor algorithms, neural networks, and/or support vector machines. Clustering algorithms can include e.g. use of deep learning methods, K-means clustering, correlation clustering, and/or kernel principal analysis.

Manager system 110 can apply process filters when performing such processing. For example, if user feedback data indicates that the sound is a dog barking sound, and not another anomalous sound, manager system 110 can restrict its performed comparisons to registered anomalous sounds specific to dog-barking sounds.

According to one embodiment, manager system 110 at examining block 1113 can query a trained predictive model trained by machine learning, as will be set forth further herein. Manager system 110 at examining block 1113 can in some instances return a classification of a currently-identified anomalous sound as belonging to the classification of a prior generic sound. In some instances, manager system 110 at examining block 1113 can classify a currently-identified anomalous sound, e.g., of a current conference, as belonging to a previously-registered generic sound and as belonging to previously-registered specific sound, e.g., and in some cases a previously registered anomalous sound has been previously associated to a particular user of system 100 (a specific dog barking sound attributable to a particular user's environment and user).

Figure 6A:
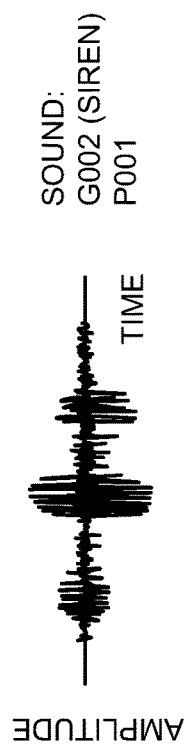
FIGS. 6A-6C are representations of dog-barking sounds that can be registered as anomalous sounds in a data repository according to one embodiment.
Figure 6B:
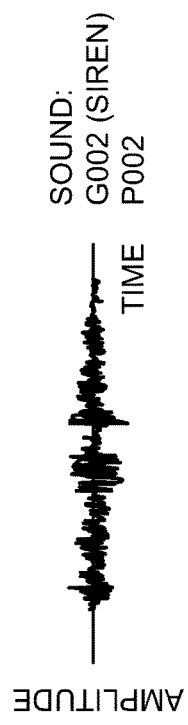
Figure 6C:
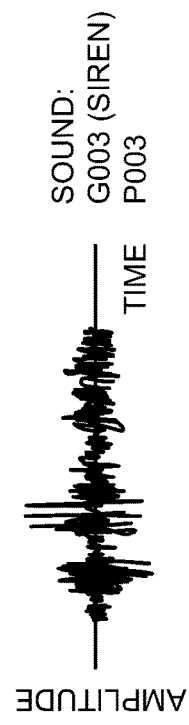

Referring to FIGS. 6A-6C, there are depicted various previously-registered representations of anomalous sounds that can be stored in sounds area 2121 of data repository 112. In FIG. 6A, there is depicted the previously-registered sound having the specific classifier P001 and the generic classifier G001 (dog barking). In FIG. 6B, there is depicted the previously-registered sound having the generic classifier G001 (dog barking) and the specific classifier P002. In FIG. 6C, there is depicted the previously-registered sound having the generic classifier G001 (dog barking) and the specific classifier P003. FIGS. 6A-6C depict previously-registered dog sounds. Embodiments herein recognize that dog-barking anomalous sounds can vary from dog to dog and, accordingly, sounds area 2121 can be populated with a plurality of specific dog barking sounds, e.g., dog barking sounds P001, P002 and P003, as depicted if FIGS. 6A-6C specific to particular dogs.

Figure 6D:
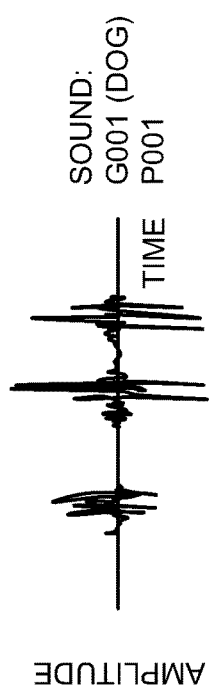
FIGS. 6D-6F are representations of anomalous sounds that can be registered in a data repository according to one embodiment.
Figure 6E:
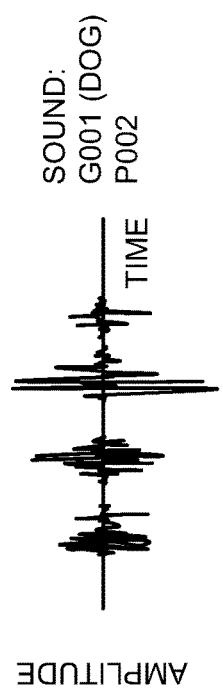
Figure 6F:
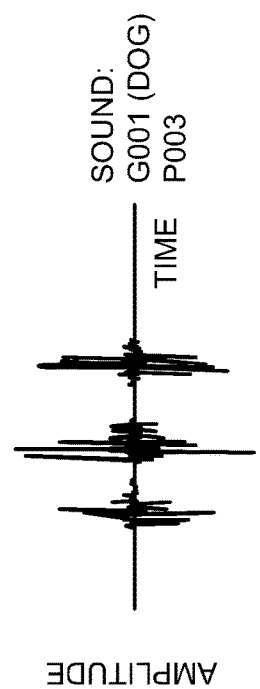

Referring to FIGS. 6D-6F, there are depicted various siren sounds. In FIG. 6D, there is depicted the siren sound having the generic classifier G002 (siren) and the specific classifier P101. In FIG. 6E, there is depicted a sound having the generic classifier G002 (siren) and the specific classifier P102. In FIG. 6F, there is depicted a sound having the generic classifier G003 (siren) and the specific classifier P103. Embodiments herein recognize that siren sounds can take on various forms and, accordingly, sounds area 2121 of data repository 112 can stored numerous species of siren sounds, e.g., as depicted in FIGS. 6D-6F.

In performing matching manager system 110 in some use cases can associate an identified anomalous sound to two or more previously registered specific anomalous sounds having specific and generic IDs, but at confidence levels not exceeding a low threshold. In such a situation, manager system 110 can match the identified sound to the generic classifier ID, can store recorded representation of the identified sound into sounds area 2121 of data repository 112 and can assign the newly stored sound representation a new specific classifier ID.

As will be set forth further herein, manager system 110 can be configured so that, upon completion of an online conference or during an online conference, manager system 110 can store in sounds area 2121 and/or in conferences area 2122 and/or in users area 2123 data collected from a current online conference. Data collected can include, e.g., data on anomalous sounds identified during the online conference, as well as data regarding the ownership of such sounds. The data on the ownership of anomalous sounds can include data on the manner in which the ownership of an anomalous sound user determined, e.g. where a certain user acknowledges ownership of the anomalous sound or whether ownership was determined based on the process of elimination. Manager system 110 can be configured so that where manager system 110 recognizes a sounds of a current online conference as belonging to a previously-registered sound, manager system 110 can record a new instance, e.g., an Nth plus 1 instance, of the previously-registered anomalous sound. Manager system 110 can be configured so that, if an anomalous sound identified during a current online conference is determined to be previously unregistered in manager system 110 in data repository 112, manager system 110 can assign a new specific classifier ID to the identified sound and can store representation of that sound and associated data into sounds area 2121 of data repository 112.

Manager system 110 can provide ownership data regarding anomalous sounds identified during an online conference. Sound ownership herein refers which user's environment produced the sound. For example, based on feedback from users Amy, Barb and Zach in the crowdsourced prompted feedback scenarios depicted with reference to FIG. 5, manager system 110 can determine that Zach is the owner of the sound in the described environment, e.g., the dog barking sound occurs within Zach's local environment, and correspondingly that Amy and Barb are not the owners of the sound, which sound has emanated from Zach's environment.

Further, in a processing scenario where data of a media stream recording buffer is examined, manager system 110 at examining block 1113 can determine in some instances that an anomalous sound identified during a current online conference is a previously-registered sound.

Further, that previously-registered sound in some cases can be associated to a particular user as an owner of that sound. Take, for example, a first conference in which the processing of FIG. 5 is performed to determine (based on processing of reporting feedback data from Amy and prompted for crowdsourced feedback data from Barb and Zach) that Zach is the owner of a particular dog-barking sound, which anomalous sound (if not previously registered) can be registered as a new registered anomalous sound. Manager system 110 can impose one or more criterion sound quality criterion for registering new anomalous sounds.

Manager system 110 can return action decision for mitigating anomalous sounds in dependence on whether manager system 110 at examining block 1113 recognizes an anomalous sound as a previously registered anomalous sound registered by manager system 110. According to one embodiment, in the case manager system 110 classified an identified anomalous sound as a prior registered anomalous sound (in one embodiment, generic, in another embodiment specific), manager system 110 can automatically return an action decision to mitigate the anomalous sound without the return being conditioned based on receipt of feedback from one or more user. According to such embodiments, in the case manager system 110 does not classify an identified anomalous sound as a prior registered anomalous sound (in one embodiment generic, in another embodiment, specific) manager system 110 can condition an action decision based on receipt of feedback data regarding the anomalous sound from one or more user. During the next conference in which Zach participates, manager system 110 can, without use of any prompted feedback for example, process at examining block 1113 an anomalous sound recorded on a streaming media recording buffer and can classify the anomalous sound as belonging the previously-registered specific sound registered for Zach's dog. Manager system 110 can further at examining block 1113, on the identification of a specific classifier for the anomalous sound, automatically associate the anomalous sound to Zach as owner of the sound based on the previously-recorded data in sounds area 2121, and can in some embodiments return an action decision (block 1114) followed by providing one or more output to perform the action decision (block 1115).

Examining at block 1113 as set forth herein, can include, e.g., processing of feedback data of a reporting user as well as prompted—for crowdsourced feedback data of users other than the reporting user and or un-prompted for crowdsourced feedback data of users other than a reporting user. In addition or alternatively, examining at block 1113 can include examining of data from a streaming media record buffer recorded at block 1105 to identify processing using buffered data of a record buffer can include processing for matching an identified anomalous sound to a prior registered anomalous sound and returning one or more of a generic classifier or a specific classifier for the identified anomalous sound of the current online conference. On completion of examining at block 1113 manager system 110 can proceed to block 1114 to return an action decision For returning an action decision at block 1114 manager system 110 can employ a decision data structure that cognitively maps conditions to action decisions. An illustrative decision data structure is set forth in Table A, which illustrates various action decisions that can be returned based on the occurrence of various conditions. As depicted in Table A, Manager system 110, in some cases, based on an examination of feedback data of users and/or record buffer data, can determine that a generic sound or alternatively a specific sound is present in an online conference, and, based on the specified action decision of the decision data structure, can return an action decision.

TABLE A

| Row | Condition | Condition | Action Decision |
| --- | --- | --- | --- |
| 1 | Manager system 110 examines feedback data of reporting User A reporting an anomalous dog barking sound in the conference, and prompted-for feedback data of B and Z. Z acknowledges that Z is the owner of a dog barking sound. | | Mute Z's device; send notification to all users specifying that the muting has been performed |
| 2 | Manager system 110 examines feedback data of reporting User A reporting an anomalous dog barking sound in the conference, and prompted-for feedback data of B and Z. B and Z do not respond | Manager system 110 independent of any reporting of any anomalous sound cannot match any identified anomalous sound to a prior registered specific or generic dog barking sound. | No action is taken |
| 3 | Manager system 110 examines feedback data of reporting User A reporting an anomalous dog barking sound in the conference, and prompted-for feedback data of B and Z. B and Z do not respond | Manager system 110 independent of any reporting of any anomalous processes data of a streaming media buffer of manager system 110 to match an identified anomalous sound of a recording buffer to a prior registered specific dog barking sound, but per history data of data repository 112 the specific registered sound has no associated user. | Apply D930 filter (specific for B's Dog); Apply D931 filter (specific for Z's Dog); send notification to all users specifying that the filtering has been performed |
| 4 | | Manager system 110 in response to reporting feedback reporting an anomalous dog barking sound | Apply D927 filter (specific); send notification to all users specifying that the filtering has been performed |

TABLE A-continued

| Row | Condition | Condition | Action Decision |
|-----|-----------|-----------|-----------------|
|  |  | processes data of a streaming media buffer of manager system 110 to match the identified anomalous sound to a prior registered specific dog barking sound, but per history data of data repository 112 the specific registered sound has no associated user. |  |
| 5 |  | Manager system 110 in response to User A providing feedback reporting an anomalous dog barking sound processes data of a streaming media buffer of manager system 110 to match an identified anomalous sound of the streaming media buffer to a prior registered specific sound, and per history data of data repository 112 the specific registered sound is associated to Z but Z has not acknowledged ownership | Apply D931 filter (specific for Z's Dog); send notification to all users specifying that the filtering has been performed |
| 6 | [Feedback data not entered by any user] | Manager system 110 independent of any reporting of any anomalous sound processes data of a streaming media buffer of manager system 110 to match an identified anomalous sound to a prior registered specific sound, and per history data of data repository 112 the specific registered sound is associated to Z as owner who has acknowledged ownership of the dog barking sound in one or more prior online conference. | Mute Z's device; send notification to all users specifying that the muting has been performed |
| 7 | [Feedback data not entered by any user] | Manager system 110 independent of any reporting of any anomalous sound processes data of a streaming media buffer of manager system 110 to match an identified anomalous sound to a prior registered specific sound, and per history data of data repository 112 the specific registered sound is associated to B as owner who has acknowledged ownership of the dog barking sound in one | Apply D930 filter (specific for B's Dog); send notification to all users specifying that the filtering has been performed |

TABLE A-continued

| Row | Condition | Condition | Action Decision |
|---|---|---|---|
| | | or more prior online conference. | |
| 8 | | Manager system 110 in response to User A's feedback reporting of an anomalous dog barking sound processes data of a streaming media buffer of manager system 110 to match an identified anomalous sound of a recording buffer to a prior registered generic dog barking sound, and per history data of data repository 112 the generic registered sound has no associated user. No second user reports and anomalous sound. | No action taken |
| 9 | | Manager system 110 in response to User A's feedback reporting of an anomalous dog barking sound processes data of a streaming media buffer of manager system 110 to match an identified anomalous sound of a recording buffer to a prior registered generic dog barking sound, and per history data of data repository 112 the generic registered sound has no associated user. A second user (B or Z) also provides an un-prompted for reporting of an anomalous dog barking sound. | Apply D001 filter (generic); send notification to all users specifying that the filtering has been performed |
| 10 | [Feedback data not entered by any user] | Manager system 110 identified an anomalous siren sound but does not classify it as belonging to a prior registered specific siren sound | No action taken |
| 11 | Feedback data regarding siren sound received from one or more user | Manager system 110 identified an anomalous siren sound but does not classify it as belonging to a prior registered specific siren sound | Apply filter D1901 to filter siren sound; send notification to all users specifying that the filtering has been performed |
| 12 | [Feedback data not entered by any user] | Manager system 110 identifies an anomalous siren sound and examining data of media recording buffer | Apply filter D1901 to filter siren sound; send notification to all users specifying that the filtering |

TABLE A-continued

| Row | Condition | Condition | Action Decision |
|-----|-----------|-----------|-----------------|
|     |           | matches the sound to a prior registered specific siren sound | has been performed |
| .   | .         | .         | .               |
| .   | .         | .         | .               |
| .   | .         | .         | .               |

Firing conditions and associated action decisions are set forth in respect to Rows 1-9. Referring to Row 1, an action decision to mute Z's line can be returned without processing any data of a streaming media record buffer. Referring to Rows 2 and 3, action decisions can be in dependence on a response to prompt for crowdsourced feedback and on processing of data of a streaming media record buffer. Referring to Rows 4, 5 and 6, action decisions can be in dependence e.g. on whether ownership of an anomalous sound and in some cases on historical data specifying ownership. For example, different action can be taken where a user in a prior conference acknowledged ownership of a sound. Manager system 110 according to one embodiment can proceed to examining at examining block 1113 only in the case that a user (e.g. user A) reports an anomalous sound. Manager system 110 in some embodiments and use cases can examine data of the streaming media buffer at examining block 1113 to identify anomalous sounds in the background independent of any reporting. Firing Row 6 and Row 7 depict the case where manager system 110 identified an anomalous sound independent of any reporting by processing data of a streaming media buffer and can fire an action decision based on a processing of history data at examining block 1113 indicating specific user ownership of a sound and further that a user (Z0 has acknowledged ownership of the sound in a prior conference. Rows 6 and 7 indicate that action decisions may be differentiated for different users who may select different preferences. Rows 8 and 9 indicate that action decisions can be in dependence on a number of users providing feedback on an anomalous sound. In Table A, A can refer to Amy, the user of client computer device 120A, B can refer to Barb, the user of client computer device 120B, and Z can refer to Zach, the user of client computer device 120Z. Comparing Row 10 and 12 a decision by manager system 110 can be in dependence on whether an identified anomalous sound of a current conference is previously registered. Comparing Rows 10 and 12, manager system 110 can condition an action decision to mitigate an anomalous sound on a factor in addition to an anomalous sound being recognized. The additional factor can be, e.g. that feedback regarding the anomalous sound is received (Row 11) or that (Row 12) the new identified anomalous sound is classified according to a prior registered specific sound. Manager system 110 can in one embodiment automatically activate an action decision to mitigate an anomalous sound (muting or filter) based on a prior registered specific anomalous sound (or a generic sound being recognized). Referring to decision blocks 1117 manager system 110 can iteratively perform e.g. blocks 1113, 114, 1115 and 1116 for an active period of a current online conference. Manager system 110 can iteratively perform examining at examining block 1113 based on the available data. The available data can include one or more feedback data or buffered media data buffered on a rolling time window basis into a media record buffer of manager system 110. In some instances feedback data can be available and in some instances feedback data can be unavailable, in which case manager system 110 can perform examining of data for mitigation of anomalous sounds using media recording buffer data without performing examining of feedback data.

Manager system 110 for applying a generic dog-barking sound filter (e.g. Row 9) can filter out sounds known to be produced by dogs when barking but do not overlap frequencies of humans when talking. Embodiments herein recognize that when a specific dog barking sound is recognized, a smarter and more specific dog barking sound filter can be applied (e.g. Row 3-5, 7), e.g., one that is tuned to suppress the particular frequencies of that specific dog sound, which do not overlap the frequencies of human voice sounds.

Manager system 110 for applying siren sound filter can remove frequencies that are present in siren sounds that do not overlap frequencies of human voice sounds. Embodiments herein recognize that where a specific siren sound is known, a more specific, more accurate and smarter filter can be applied to selectively remove frequencies of a particular siren sound that did not overlap sounds of a human voice.

Manager system 110 at block 1115 can provide one or more output to perform the action decision returned at block 1114. As set forth herein, the one or more output can include such outputs as communications to various client computer devices of client computer devices 120A-120Z to activate so that device muting is activated on the client computer device receiving a mute communication. One or more output provided at block 1115 can also alternatively include an output to apply one or more filters.

Manager system 110 at block 1115 for providing or more output for performing one or more action can send communications for receipt by client computer devices of client computer devices 120A-120Z so that the local client computer devices implement local filtering. In some embodiments, central filtering can be implemented in which case manager system can apply a filter specified by an action decision, e.g., a generic sound filter or a specific sound filter.

Manager system 110 at block 1115 can send various communications for various purposes for receipt by respective client computer devices 120A-120Z at blocks 1205, 2206 and 3206, respectively. In addition or alternative to the communications described to be received by local client computer devices 120A-120Z, one type of communication can include a notification. For example, referring to user interface 400 as set forth in FIG. 4, manager system 110 at block 1115 can send a notification resulting in a user interface change in Area 440 of user interface 400 being displayed differently on each of the respective client computer devices 120A-120Z. Area 440 and area 441 can specify actions taken by manager system 110 in response to an anomalous sound being identified. Text data in area 441 can specify, for example, such actions as "Zach's device is now muted", "Barb's device is now muted", "dog barking sound is now being filtered", "siren sound is now being filtered" and the like.

Manager system 110 can proceed to machine learning training block 1116. According to one embodiment, machine learning training block 1116 can include, without further processing, manager system 110 storing data derived from a current online conference being terminated into various areas of data repository 112 such as sounds area 2121 conferences area 2122, and/or users area 2123 so that these areas of data repository 112 become richer and the information that they contain for improved servicing of future online conferences, e.g., in providing more instances in which an anomalous sound can be matched to a previously-registered anomalous sound. Stored data can include, e.g., identified anomalous sounds and ownership data of the anomalous sounds, e.g., whose environment produced the anomalous sound. Wherein an anomalous sound of a terminated online conference was recognized as belonging to a classification of a previously-registered sound, a new instance of the previously-registered sound can be recorded, together with ownership information of users related to the sound. Where an identified anomalous sound is determined to previously-unregistered sound, manager system 110, when storing data of the new sounds into data repository 112, can assign a new specific ID number to the newly-recorded sound. In some embodiments, the assignment can be conditional on a sound quality (e.g. base on signal to noise ratio) of the new anomalous sound being above a threshold. While a process is described wherein manager system 110 can store conference derived data into sounds area 2121 conferences area 2122, and/or users area 2123 of data repository 112 on termination of a current conference, manager system 110 can alternatively store derived data into sounds area 2121 conferences area 2122, and/or users area 2123 during the conducting of the current contline conference by manager system 110 prior to the termination of the current online conference.

Ownership data for each sound recorded in data repository 112, e.g., in sounds area 2121, can include an anomalous sound ID number and ownership information of the sound, conference ID and ownership information of the sound during the conference. For example, in the crowd-sourced feedback data based ownership discrimination process described with reference to FIG. 5, Manager system 110 determined that Amy is not the owner of the dog-barking sound, Barb is not the owner of the dog-barking sound, and Zach is, in fact, the owner of the dog-barking sound, and that Z acknowledged ownership. Thus, a data record for such a scenario can be recorded into sounds area 2121 of Data Repository 112 as follows: "Conference ID X01; Amy: notowner; Barb: notowner; Zach: owner_ack; SoundID: G001, P004."

Machine learning processes performed by manager system 110 can in addition alternatively include processes to train one or more predictive models. According to one embodiment, manager system 110 can iteratively train predictive model 7002 using historical data stored, or for storage, into data repository 112.

Predictive model 7002 as set forth in FIG. 7A can be trained by machine learning processes. Predictive model 7002 as shown in FIG. 7A can be iteratively trained by machine learning to predict the owner of an identified sound identified in a current online conference. Referring to FIG. 7A, training data for training predictive model 7002 can include, for instance, sound data and per-instance ownership data associated with per-instance sound data. Per-instance sound data can be data of an anomalous sound identified during an instance of an online conference and the ownership data and the per-instance ownership data associated with the per-instance sound data can be data that specifies ownership of the anomalous sound. In the described example, with reference to FIG. 7A for Zach as the owner, Zach was determined to be the owner of the anomalous dog barking sound, while Amy and Barb were determined to be non-owners of the anomalous sound. Per-instance sound data and per-instance ownership data can be iteratively applied as labels for training predictive model 7002 on an iterative basis, e.g., on a once-per-online-conference basis, or on a once-per-anomalous-sound-being-identified basis.

Per-instance sound data associated with per-instance ownership data can be iteratively applied to predictive model 7002 for training predictive model 7002 by machine learning. Predictive model 7002 once trained, can be able to respond to query data. Query data can include an identified sound. For example, according to one embodiment, an identified sound identified by manager system at examining block 1113, can be input during the course of performance of examining block 1113 into predictive model 7002 which has been trained using prior historical data of data repository 112. In response to the input of the query data, predictive model 7002 can output return data. The output return data can be a sound classification, an ownership set associated to the input identified sound user defined data input into predictive model 7002. Thus, for example, manager system 110, during performing examining at block 1113 can input data representing an identified anomalous sound and, in response, predictive model 7002 can return the classifier for the identified sound as well as ownership data for the identified sound. The classification can specify a generic classifier for the input sound and/or a specific classifier for the input sound.

Returned sound classification and ownership data can be associated to confidence levels, which confidence levels can be examined by manager system 110. Manager system 110 can use such confidence levels as thresholds to determine whether, e.g. to apply returned information of a predictive model into a decision data structure (as shown in Table A) to return an action decision. The returned action decision can be in dependence on ownership data returned with use of predictive model 7002. For example, based on predictive model 7002 returning ownership data indicating that a specific user has originated the identified anomalous sound, manager system 110 can return an action decision to mute that specific user's client computer device.

Figure 7B:
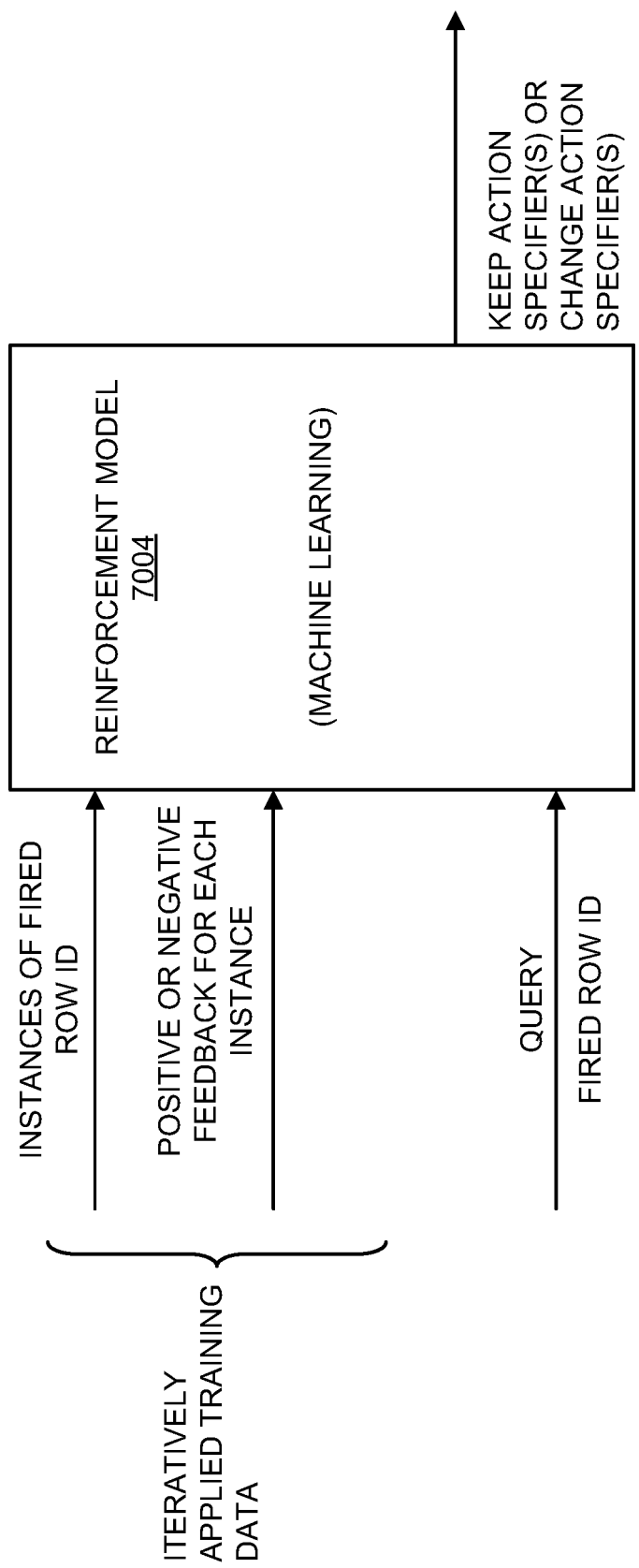
FIG. 7B depicts a reinforcement model that can be trained using training data by machine learning processes according to one embodiment.

In reference to FIG. 7B, another machine learning process that can be performed by manager system 110 by activation of machine learning process 118 (FIG. 1) is described. Referring to FIG. 7B, manager system 110 can iteratively train reinforcement model 7004 using iteratively applied training data. The iteratively applied training data can include instances of a fired row ID and a positive or negative feedback associated with each instance. Thus, whenever row X of the decision data structure of Table A is fired to return a specified one or more action, a positive or negative feedback associated to the one or more action can be applied as training data to train reinforcement model 7004. The positive or negative feedback can vary depending on the specified action. Where the action specified is a notification promoting a product, the positive or negative action can specify whether the promoted product was actually purchased. With the successful purchase of the product indicating a positive feedback for the notification and failure to purchase indicating a negative feedback associated with the notification.

Upon being trained, reinforcement model 7004 can be responsive to queries by manager system 110. Manager system 110 can be configured to iteratively query the predictive model 7002 as depicted in FIG. 7A, and the reinforcement model 7004 as depicted in FIG. 7B at intervals, e.g. configurable intervals configurable with use of administrator user interface displayed on administrator client computer device 125. In response to being queried with a row X ID, reinforcement model 7004 can return a response to provide one or more action specifier for row X. The response can specify that the current action is to be maintained, e.g. in the case the feedback over the course of iterations for the specified action has been positive or can specify an action specifier(s), e.g. in the case that over the course of iterations there has been negative feedback associated with the current action(s). A new action specifier can be obtained from a list, e.g. an administrator authored list authored using administrator user interface 500 or an automatically generated list generated with use of machine learning process.

Various available tools, libraries, and/or services can be utilized for implementation of predictive model 7002 and reinforcement model 7004. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models.

Manager system 110 at block 1117 can determine whether a current conference has been terminated and if no can return to block 1106 to iteratively perform block 1106-1116 until the current conference is terminated. On termination of a current conference, manager system 110 can return to block 1102 according to one embodiment (block 1118). There is set forth herein according to on embodiment, (A) recording of on line conference sounds during a rolling time window; (B) a certain conference user hears an anomalous sound; (C) A conference owner and/or participant users combine to state that the not the cause of the sound; (D) action is taken (e.g. a client computer device is muted and/or a filter is applied); (E) the sound is recorded; (F) in a future call the action (e.g. muting and/or filtering) can be initiated immediately based on recognition of the anomalous sound.

Certain embodiments herein offer various technical computing advantages involving competing advantages to address problems rising in the realm of computer networks and systems. Embodiments herein can perform recognition processing to recognize anomalous sounds in an online conference. One or more decision data structure can be used to return artificial intelligence (AI) decisions based on return classifications of anomalous sounds. Machine learning processes can be employed such as machine learning processes to automatically update a decision data structure that cognitively maps conditions to action decisions for mitigating anomalous sounds in an online conference. Embodiments herein can improve the performance of computer systems and networks in the environment of online conference by identification and mitigation of anomalous sounds. Embodiments herein can employ for example crowdsource features that intelligently collect prompted—for feedback or unprompted for feedback respecting anomalous sounds in an online conference environment. Embodiments herein can use such feedback for the identification of anomalous sounds and for return of action decisions for mitigation of an identified anomalous sounds. Machine learning processes can be performed for increased accuracy and for reduction of reliance on rule-based criteria and thus reduce computational overhead. Machine learning processes can be employed, e.g., for improved return of action decisions and/or for return of data specifying ownership of an identified anomalous sound. For enhancement of computation accuracies, embodiments can feature competition platforms existing only in the realm of computer networks, such as artificial intelligence (AI) platforms and machine learning platforms. Embodiments herein can employ data structuring processes, e.g., processing for transforming unstructured data into a form optimized for computerized processing. Embodiments herein for recognizing an anomalous sound and employing such processes as natural language processing and NLP processes for processing of text-based feedback entered into a client computer device by a user in an online conference. Embodiments herein can employ data structuring processes, e.g., processing for transforming unstructured data into a form optimized for computerized processing.

Figure 8:
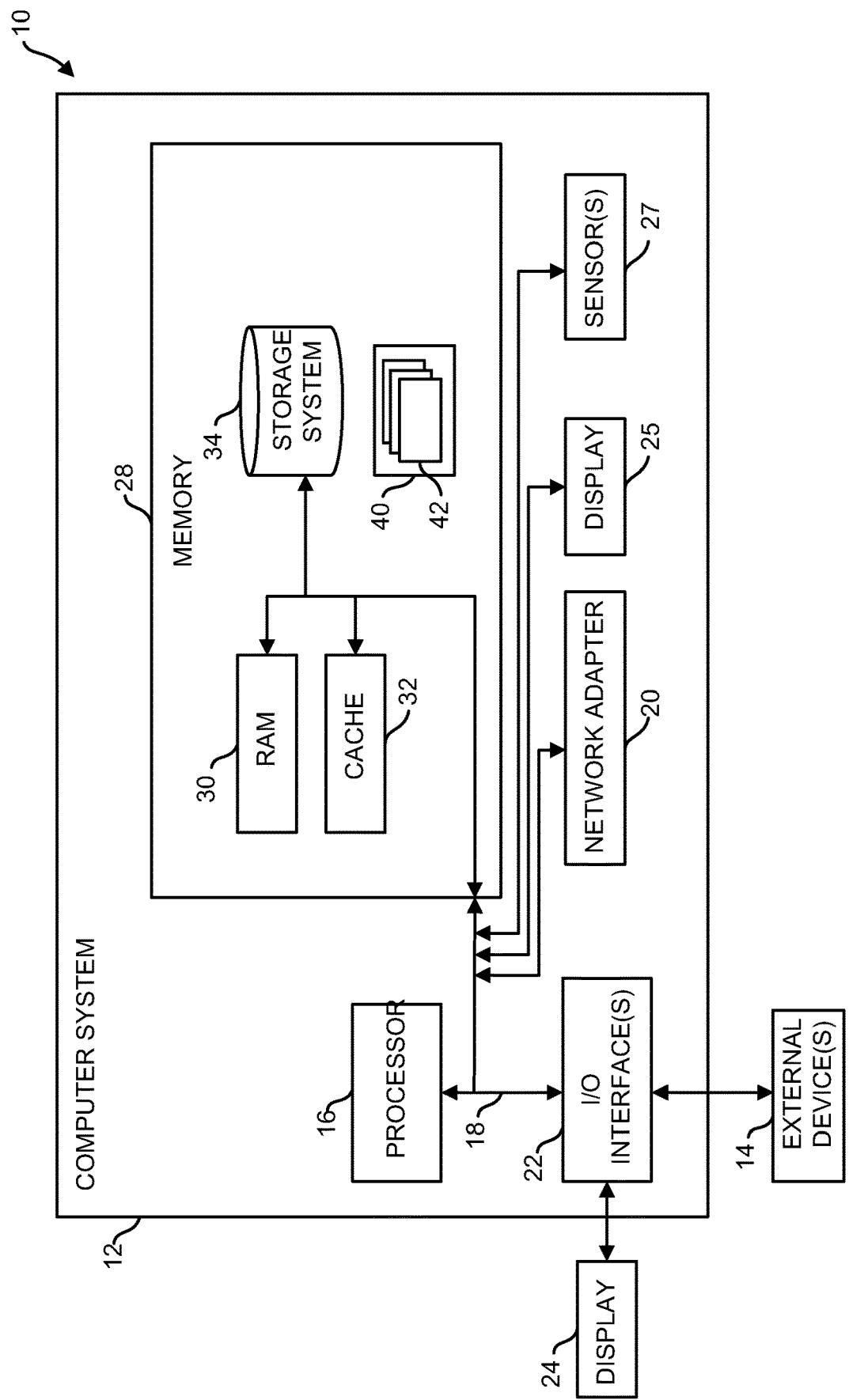
FIG. 8 depicts a computing node according to one embodiment.
Figure 9:
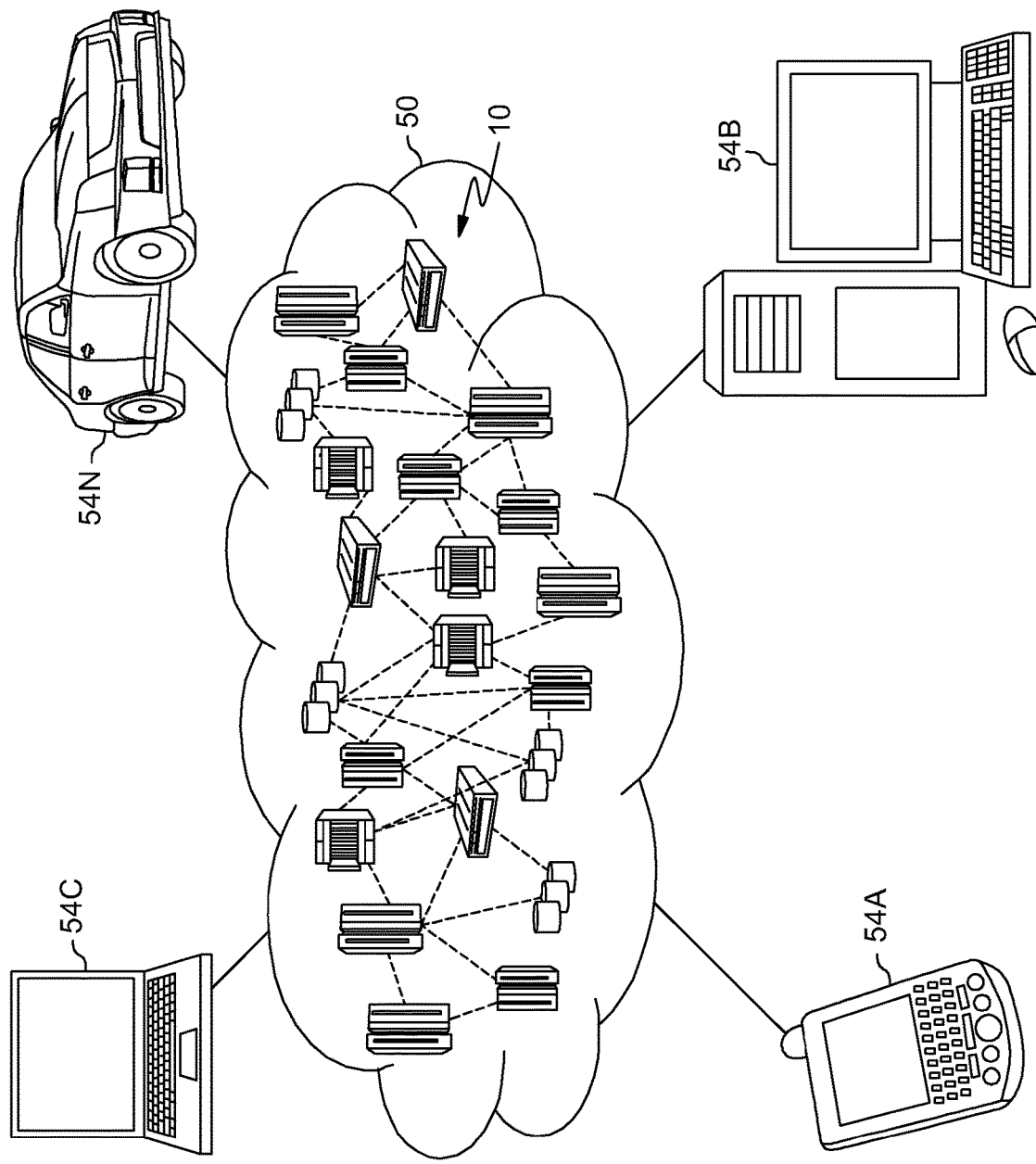
FIG. 9 depicts a cloud computing environment according to one embodiment.
Figure 10:
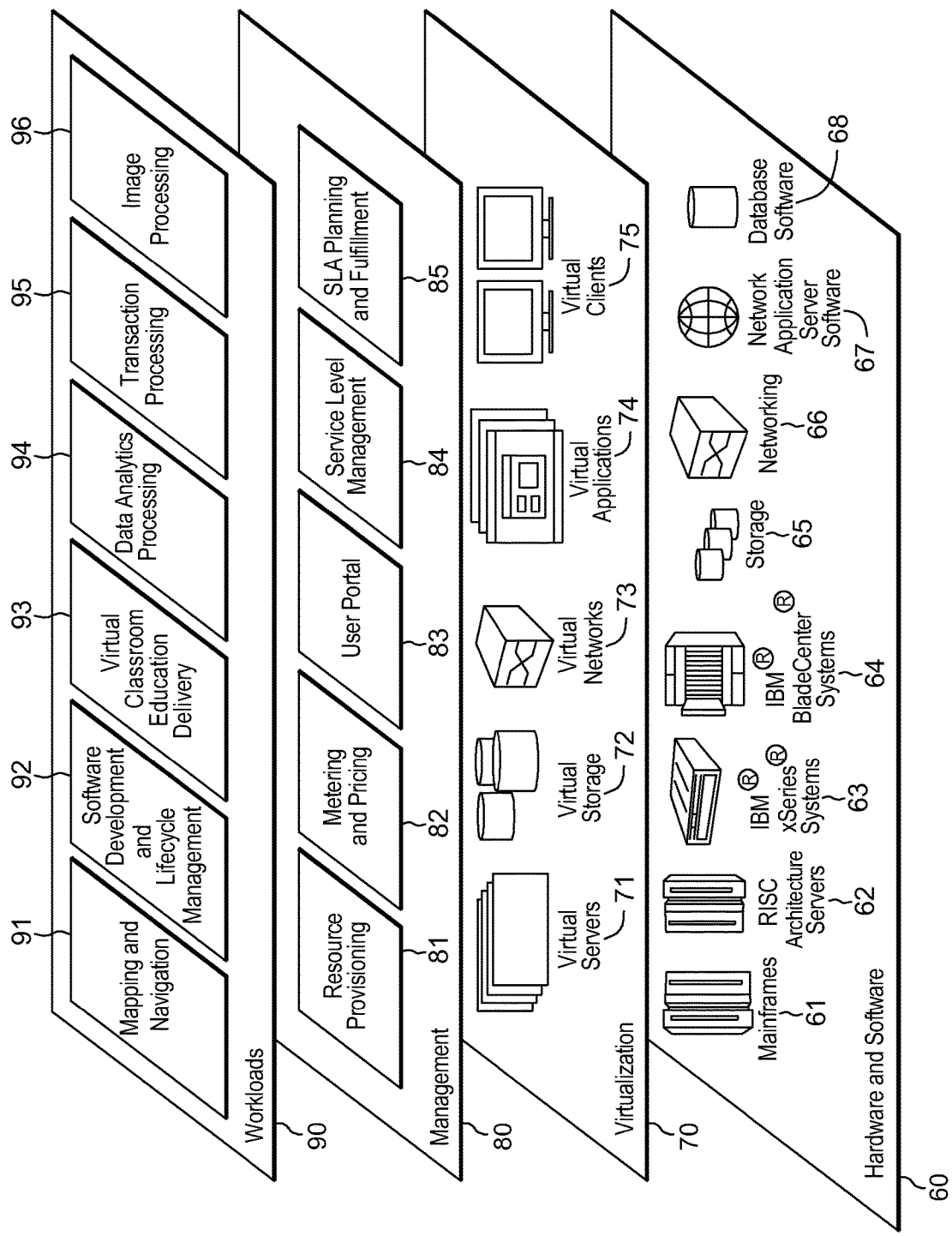
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2 and functions described with reference to manager system 110 as set forth in the flowchart of FIGS. 3A-3B. In one embodiment, one or more client computer device 120A-120Z can include one or more computing node 10 and can include one or more program 40 for performing functions described with reference to one or more client computer device 120A-120Z as set forth in the flowchart of FIGS. 3A-3B. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for mitigating anomalous sounds set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method comprising:
    activating a streaming media recording buffer that records streaming media of an online conference, the online conference having first second and third user online conference participant users;
    examining data to return an action decision, the examining data to return an action decision including examining data of the streaming media recording buffer to identify an anomalous sound represented in the recorded media stream data of the streaming media recording buffer;
    returning an action decision based on the examining data to mitigate the anomalous sound; and
    providing one or more output to mitigate the anomalous sound in accordance with the returned action decision, wherein the examining includes matching an identified anomalous sound recorded in the streaming media buffer to a previously registered anomalous sound occurring in one or more prior online conference recorded in a data repository, wherein the action decision is in dependence on a processing of ownership data of the previously registered anomalous sound that specifies which of the first second or third participant users originated the anomalous sound in the one or more prior conference, and wherein the action decision is further in dependence on a processing of further ownership data of the previously registered anomalous sound that specifies the manner in which ownership of the previously registered sound was determined in the a prior registered online conference.

2. The computer-implemented method of claim 1, wherein the examining data to return an action decision is responsive to feedback data being received by a user participant of the first second and third online conference user participants.

3. The computer-implemented method of claim 1, wherein the providing one or more output is activated responsively to feedback data specifying the occurrence of the anomalous sound being received from N or more participant users of the online conference, wherein N is an integer number greater than 1.

4. The computer-implemented method of claim 1, wherein the method includes receiving from the first online conference participant user reporting feedback data entered using a client computer device of the online conference, the reporting feedback data specifying an anomalous sound occurring within an online conference, wherein the method includes responsively to the receiving the reporting feedback data from the first online conference participant user specifying the anomalous sound, prompting second and third user participants of the online conference to enter crowdsourced feedback data respecting the anomalous sound, wherein the method includes receiving crowdsourced feedback data from the second and third users, and wherein the examining data to return an action decision further includes examining the reported feedback data and the crowdsourced feedback data.

5. The computer-implemented method of claim 1, wherein the method includes receiving from the first online conference participant user feedback data entered using a client computer device of the online conference, wherein the online conference user participant user defined feedback data entered into the client computer device is entered into one or more of the following selected from the group consisting of (a) a displayed user interface, and (b) a DTMF menu user interface, wherein the one or more output to mitigate the anomalous sound is selected from the group consisting of (i) an output to mute the client computer device originating the anomalous sound, and (ii) an output to filter the anomalous sound using an audio filter.

6. The computer-implemented method of claim 1, wherein the method includes iteratively training a predictive model by machine learning, the iterative training including applying as timing data to the predictive model a training dataset comprising anomalous sound data and ownership data associated to the anomalous sound data, wherein the method includes using the predictive model that has been trained to return a prediction of anomalous sound classification and ownership in response to a query to the predictive model, wherein the query includes data specifying an identified anomalous sound, wherein the query is absent of ownership data of the identified anomalous sound, and wherein the method includes returning the action decision to mitigate the identified anomalous sound in dependence on the returned predicted ownership returned by the query to the predictive model trained by machine learning.

7. The computer-implemented method of claim 1, comprising:
    receiving from the first online conference participant user reporting feedback data entered using a client computer device of the online conference, the reporting feedback data specifying an anomalous sound occurring within an online conference;

responsively to the receiving the reporting feedback data from the first online conference participant user specifying the anomalous sound, prompting second and third user participants of the online conference to enter crowdsourced feedback data respecting the anomalous sound;

receiving crowdsourced feedback data from the second and third users;

processing the user participant defined feedback data and the crowdsourced feedback data from the second and third users; and returning the action decision based on the processing to mitigate the anomalous sound.

8. The computer-implemented method of claim 7, wherein the method includes maintaining a rolling window streaming media recording buffer that records streaming media of the online conference of the online conference, wherein the method includes, in response to receiving the user defined feedback data, examining data of the streaming media recording buffer to identify the anomalous sound represented in recorded media stream data of the streaming media recording buffer, storing a representation of the identified anomalous sound identified by the examining into a data repository and examining during a subsequent online conference examining the representation stored in the data repository for return of an a decision in the subsequent online conference.

9. The computer-implemented method of claim 7, wherein the method includes maintaining a rolling window streaming media recording buffer that records streaming media of the online conference of the online conference, wherein the method includes, in response to receiving the user defined feedback data, examining data of the streaming media recording buffer to identify the anomalous sound represented in recorded media stream data of the streaming media recording buffer, wherein the method includes in response to the anomalous sound being identified by the examining storing a representation of the anomalous sound into a data repository, and wherein the method includes in a subsequent online conference examining the representation of the anomalous sound stored in the data repository to determine a decision returned in the subsequent online conference to mitigate an anomalous sound in the subsequent online conference.

10. The computer-implemented method of claim 7, wherein responsively to the receiving the user participant defined feedback data from the first online conference specifying the anomalous sound, examining data of a media stream recording buffer to identify a recorded representation of the anomalous sound; matching the recorded representation of the anomalous sound to a previously registered anomalous sound having an associated stored representation; and returning the action decision based on the matching, the action decision being an action to mitigate the anomalous sound.

11. The computer-implemented method of claim 7, wherein the returning an action decision includes using a decision data structure that cognitively maps conditions with action decisions, and wherein action decisions specified in the decision data structure are iteratively updated by machine learning.

12. The computer-implemented method of claim 7, wherein the online conference user participant user defined feedback data entered into the client computer device is entered into a displayed user interface.

13. The computer-implemented method of claim 7, wherein the online conference user participant user defined feedback data entered into the client computer device is entered into DTMF menu user interface.

14. The computer-implemented method of claim 7, wherein the one or more output to mitigate the anomalous sound is an output to mute the client computer device originating the anomalous sound, and wherein the one or more output to mitigate the anomalous sound is an output to filter the anomalous sound using an audio filter.

15. The computer-implemented method of claim 7, wherein the method included using Natural Language Processing (NLP) to process the user participant user defined feedback data.

16. A computer program product comprising:
a computer readable storage medium readable by one or more processing circuit and storing instructions for execution by one or more processor for performing a method comprising:
activating a streaming media recording buffer that records streaming media of an online conference, the online conference having first second and third user online conference participant users;
examining data to return an action decision, the examining data to return an action decision including examining data of the streaming media recording buffer to identify an anomalous sound represented in the recorded media stream data of the streaming media recording buffer;
returning an action decision based on the examining data to mitigate the anomalous sound; and
providing one or more output to mitigate the anomalous sound in accordance with the returned action decision, wherein the examining includes matching an identified anomalous sound recorded in the streaming media buffer to a previously registered anomalous sound occurring in one or more prior online conference recorded in a data repository, wherein the action decision is in dependence on a processing of ownership data of the previously registered anomalous sound that specifies which of the first second or third participant users originated the anomalous sound in the one or more prior conference, and wherein the action decision is further in dependence on a processing of further ownership data of the previously registered anomalous sound that specifies the manner in which ownership of the previously registered sound was determined in a prior registered online conference.

17. The computer program product of claim 16, wherein the examining data to return an action decision is responsive to feedback data being received by a user participant of the first second and third online conference user participants.

18. A system comprising:
a memory;
at least one processor in communication with the memory; and
program instructions executable by one or more processor via the memory to perform a method comprising:
activating a streaming media recording buffer that records streaming media of an online conference, the online conference having first second and third user online conference participant users;
examining data to return an action decision, the examining data to return an action decision including examining data of the streaming media recording buffer to identify an anomalous sound represented in the recorded media stream data of the streaming media recording buffer;

returning an action decision based on the examining data to mitigate the anomalous sound; and providing one or more output to mitigate the anomalous sound in accordance with the returned action decision, wherein the examining includes matching an identified anomalous sound recorded in the streaming media buffer to a previously registered anomalous sound occurring in one or more prior online conference recorded in a data repository, wherein the action decision is in dependence on a processing of ownership data of the previously registered anomalous sound that specifies which of the first second or third participant users originated the anomalous sound in the one or more prior conference, and wherein the action decision is further in dependence on a processing of further ownership data of the previously registered anomalous sound that specifies the manner in which ownership of the previously registered sound was determined in a prior registered online conference.

19. The computer program product of claim 16, wherein the method includes receiving from the first online conference participant user feedback data entered using a client computer device of the online conference, wherein the online conference user participant user defined feedback data entered into the client computer device is entered into one or more of the following selected from the group consisting of (a) a displayed user interface, and (b) a DTMF menu user interface, wherein the one or more output to mitigate the anomalous sound is selected from the group consisting of (i) an output to mute the client computer device originating the anomalous sound, and (ii) an output to filter the anomalous sound using an audio filter.

20. The system of claim 18, wherein the action decision is an action decision selected from the group consisting of a first action decision based on the third participant user being specified as the owner of the anomalous sound but not acknowledging ownership of the anomalous sound, and a second action decision based on the third participant user being specified as the owner of the anomalous sound and acknowledging ownership of the anomalous sound.

* * * * *